US009916631B2

(12) United States Patent
Hill

(10) Patent No.: US 9,916,631 B2
(45) Date of Patent: Mar. 13, 2018

(54) MULTI-PURPOSE ELECTRONIC SWITCH

(71) Applicant: Amatis Controls, LLC, Aspen, CO (US)

(72) Inventor: David Alex Hill, Aspen, CO (US)

(73) Assignee: AMATIS CONTROLS, LLC, Aspen, CO (US)

(*) Notice: Subject to any disclaimer, the term of this patent is extended or adjusted under 35 U.S.C. 154(b) by 0 days.

(21) Appl. No.: 14/801,334

(22) Filed: Jul. 16, 2015

(65) Prior Publication Data

US 2016/0020047 A1 Jan. 21, 2016

Related U.S. Application Data

(60) Provisional application No. 62/025,438, filed on Jul. 16, 2014.

(51) Int. Cl.
*H01H 23/30* (2006.01)
*G06Q 50/06* (2012.01)
(Continued)

(52) U.S. Cl.
CPC ............ *G06Q 50/06* (2013.01); *G06F 1/181* (2013.01); *G06F 3/044* (2013.01); *G06F 3/0412* (2013.01); *G06F 3/0482* (2013.01); *G06F 3/0488* (2013.01); *G06F 3/14* (2013.01); *G06Q 30/0283* (2013.01); *G08C 17/02* (2013.01); *H01H 23/025* (2013.01); *G08C 2201/30* (2013.01); *G08C 2201/92* (2013.01); *G09G 2354/00* (2013.01); *G09G 2380/14* (2013.01);
(Continued)

(58) Field of Classification Search
CPC .... G06Q 50/06; G06Q 30/0283; H01H 23/30; G06F 1/181; G06F 3/0412; G06F 3/044; G06F 3/0482; G06F 3/0488; G06F 3/14; G08C 17/02; G08C 2201/30; G08C 2201/92; G09G 2354/00; G09G 2380/14
USPC ....................................................... 340/12.5
See application file for complete search history.

(56) References Cited

U.S. PATENT DOCUMENTS 9,683,867 B2 * 6/2017 Quady .................... G01D 4/00
2012/0260206 A1 * 10/2012 Cipollo ............... G06Q 10/109
715/771
(Continued)

FOREIGN PATENT DOCUMENTS

DE 102015006707 A1 * 12/2016

*Primary Examiner* — Hirdepal Singh
(74) *Attorney, Agent, or Firm* — Kilpatrick Townsend & Stockton LLP

(57) ABSTRACT

A multi-purpose electronic switch is disclosed herein. The multi-purpose electronic switch includes a housing having a front and a back and defining an internal volume, a switch having a default position and movable to a first position and a second position from the default position. The switch can receive a press-button input by moving from the default position to one of the first and second positions. The multi-purpose electronic switch can include a display located on the switch, and a plurality of sensors located within the internal volume of the housing. The plurality of sensors can detect a swipe input across the front of the housing. The multi-purpose electronic switch can include a processor that can control the display to generate images representing a plurality of menu items and settings within the menu items and receive inputs selecting menu items.

12 Claims, 21 Drawing Sheets

(51) Int. Cl.
  *G08C 17/02*   (2006.01)
  *G06F 3/041*   (2006.01)
  *G06F 3/0488*  (2013.01)
  *G06F 3/0482*  (2013.01)
  *G06F 3/044*   (2006.01)
  *G06F 1/18*    (2006.01)
  *G06F 3/14*    (2006.01)
  *G06Q 30/02*   (2012.01)
  *H01H 23/02*   (2006.01)

(52) U.S. Cl.
  CPC ........... *H01H 2219/0023* (2013.01); *H01H 2219/0026* (2013.01); *H01H 2239/006* (2013.01)

(56) References Cited

U.S. PATENT DOCUMENTS

| | | | | |
|---|---|---|---|---|
| 2014/0292396 | A1* | 10/2014 | Bruwer | H03K 17/955 327/517 |
| 2014/0316581 | A1* | 10/2014 | Fadell | F24F 11/0009 700/276 |
| 2014/0327621 | A1* | 11/2014 | Faggin | G06F 3/0202 345/168 |
| 2015/0200787 | A1* | 7/2015 | Slupik | G05B 15/02 700/275 |
| 2015/0382436 | A1* | 12/2015 | Kelly | G08C 17/02 315/131 |
| 2016/0138824 | A1* | 5/2016 | Patel | F24F 11/0034 700/276 |

* cited by examiner

MULTI-PURPOSE ELECTRONIC SWITCH

CROSS-REFERENCES TO RELATED APPLICATIONS

This application claims the benefit of U.S. Provisional Application No. 62/025,438, filed Jul. 16, 2014, and entitled "WIRELESS GESTURE ACTIVATED SWITCH, THERMOSTAT, HUMISTAT, AND COST DISPLAY FOR HVAC, WATER HEATING, AND LIGHTING SYSTEM CONTROL," the entirety of which is hereby incorporated by reference herein.

BACKGROUND

Prior art for light switches and dimmers have commonly controlled "ON/OFF" control and dimming control for light fixtures through line voltage, low voltage, and wireless connections. Thermostats commonly display indoor conditions and provide control of heating and cooling systems through wired connections to the building systems. Several variations of lighting, water heating, and HVAC controls have been developed and marketed to offer control and monitoring of building systems with backlit touch activated LED screens, press button switches, and sliders. Thermostats and humidistats commonly have multi-purposed touch screen displays and controls as well and press-button and slide controls.

BRIEF SUMMARY

Embodiments disclosed herein, unique and novel to prior art, include but are not limited to, electronic devices fitted with 6LoWPAN wireless communication modules which meter, monitor, and control HVAC, water heating, lighting systems, and other mechanical and hydronic systems. Other embodiments include devices fitted with other wireless communication protocols, other radio frequency protocols or WiFi. Performance data and controls are displayed on the device's integrated, gesture activated, black-and-white, display. The device can be used as a multi-purpose switch, data display, meter, monitor, and control for lamps, light fixtures, dimmers, drivers, boilers, domestic hot water tanks, solar hot water systems, PV solar systems, fans, de-humidifiers, zone valve controllers, light sensors, motions sensors, and more. The real-time user cost for any specific system is displayed on the screen with programmable software based on algorithms, which calculate the performance of building systems and determine a cost-per-hour data point displayed on the screen.

The term 6LoWPAN is a radio frequency communications standard, which stands for Internet Protocol 6 over Low power Wireless Personal Area Networks. The term HVAC stands for heating, ventilation, and air conditioning systems. 6LoWPAN wireless communication networking for energy meters, energy monitors, and control devices allow building management systems to connect to the Internet via a machine-to-machine interface, giving users access to detailed data and remote control of mechanical and electronic systems from web-based. Capability for detailed data analysis and the ability for programmable smart building systems create significant opportunities to reduce energy usage, maximize energy efficiency, and optimize system performance of HVAC, water heating, and lighting systems.

One aspect of the present disclosure relates to a multi-purpose electronic switch. The multi-purpose electronic switch includes a housing having a front and a back and defining an internal volume, a switch having a default position and movable to a first position and a second position from the default position, which switch can receive a press-button input moving the switch from the default position to one of the first and second positions, a display located on the switch, and a plurality of sensors located within the internal volume of the housing. In some embodiments, the sensors can detect a swipe input across the front of the housing. The multi-purpose electronic switch can include a processor located within the internal volume of the housing and communicatingly connected with the switch, the display, and the plurality of sensors. In some embodiments, the processor can control the display to generate images representing a plurality of menu items and settings within the menu items, receive an input from the plurality of sensors selecting one of the plurality of menu items, and receive an input from the switch changing a setting within the selected one of the plurality of menu items.

In some embodiments of the multi-purpose electronic switch, the switch can be a rocker switch. In some embodiments, the rocker switch can have a top, a bottom, a left side, and a right side. In some embodiments, the plurality of sensors can include: a first sensor, a second sensor, a third sensor, and a fourth sensor. In some embodiments, the first sensor is located proximate to the left side of the switch, the second sensor is located proximate to the right side of the switch, the third sensor is located proximate to the top of the switch, and the fourth sensor is located proximate to the bottom of the switch.

In some embodiments, the first and second sensors can detect a swipe between the left side of the switch and the right side of the switch, and the third and fourth sensors can detect a swipe between the top of the switch and the bottom of the switch. In some embodiments, the processor can navigate between a first set of menu items in response to a swipe between the left side of the switch and the right side of the switch, and the processor can navigate between a second set of menu items in response to a swipe between the top of the switch and the bottom of the switch. In some embodiments, at least one of the first, second, third, and fourth sensors is a capacitive sensor.

In some embodiments, the multi-purpose electronic switch includes an antenna module controllable by the processor to transmit and receive radio signals. In some embodiments, the processor can control the antenna module to transmit a radio signal to control operation of a device in communication with the multi-purpose electronic switch in response to an input received by the switch. In some embodiments, the multi-purpose electronic switch includes a power source that can be one of: a battery, low-voltage wires, and line-voltage wires. In some embodiments, the housing includes a first recess in the back of the housing and an adhesive located in the recess. In some embodiments, the housing includes a second recess located in the back of the housing and extending to a side of the housing. In some embodiments, the display is an electronic paper display.

One aspect of the present disclosure relates to a method of communicating with and controlling a plurality of devices. The method includes installing a plurality of devices. In some embodiments, the plurality of devices can transmit and receive radio signals. In some embodiments, the devices of the plurality of devices can be at least one of: lighting devices; heating devices; cooling devices; mechanical controls; hydronic controls; and building energy systems. The method can include activating the plurality of devices. In some embodiments, the activated plurality of devices transmit and receive radio signals. The method can include collecting data from the devices in the plurality of devices, which collection of data can enable wireless communication to control the devices of the plurality of devices remotely, and wirelessly communicating to control the devices of the plurality of devices.

One aspect of the present disclosure relates to a method of calculating and displaying cost-per-hour data for performance of building systems. The method can include receiving an input identifying a first system for operation adjustment. In some embodiments, the first system can include at least one of: a heating system; a cooling system; a water heating system; a refrigeration system; a lighting system; and an electro-mechanical system. The method can include identifying a first operation level of the identified first system, identifying a first net power consumption of the identified first system, which first net power consumption can be a net-positive or net-negative power consumption, identifying a change increment, which change increment can be a step either increasing or decreasing the operation level of the identified first system, identifying a second operation level, which second operation level can include the first operation level incremented or decremented by the change increment, and identifying a power-cost function, which power-cost function can identify a cost of power per unit of energy consumption. The method can include calculating a first power cost, which first power cost can include the cost of operating the first system and the first operation level, calculating a second power cost, which second power cost can include the cost of operating the second system and the second operation level, displaying the first power cost and the second power cost, and receiving an input selecting operation of the first system at one of the first and second power costs. In some embodiments, the electro-mechanical system includes at least one of: a door-locking system; a building securement system; an air circulation system; an energy generation system; a solar system; and a geothermal system.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION

Figure 1:
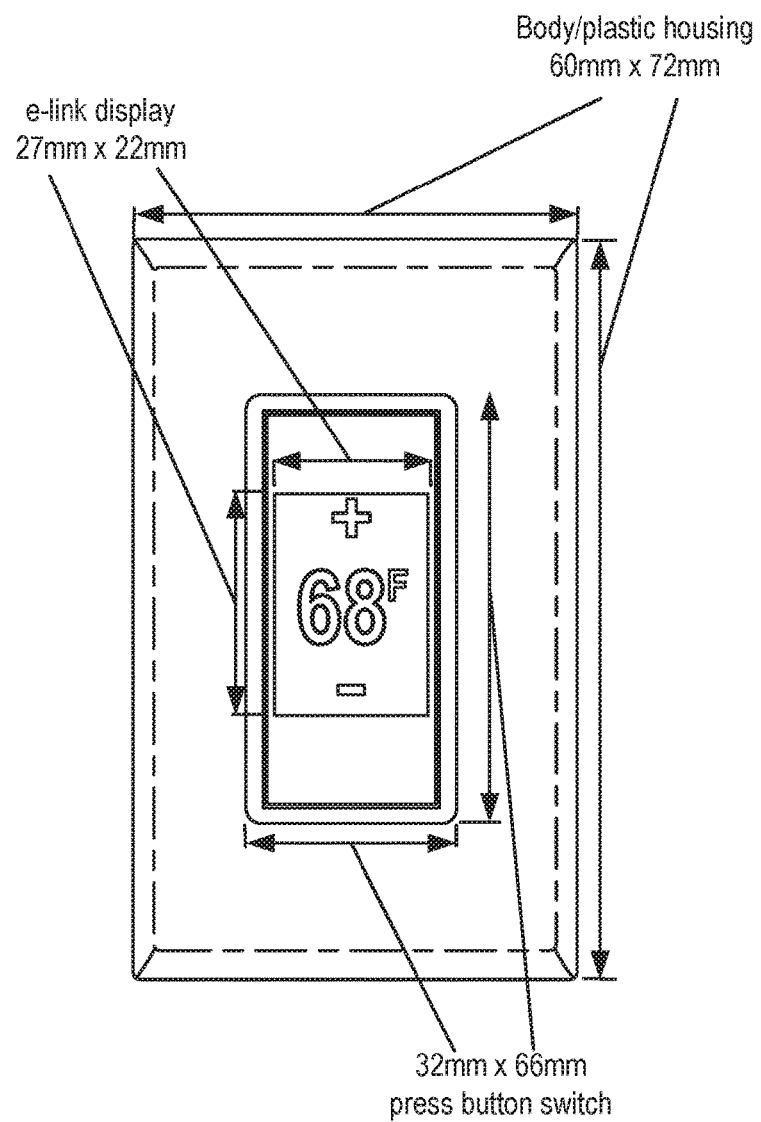
FIG. 1 illustrates a visual representation of one embodiment of the device. This schematic details the device with rocker press-button switch, display, which can include, for example, electronic paper display, a LCD display, an electronic visual display, a flat-panel display, a refreshable braille display, or the like. The schematic details a plastic housing with general dimensions. Sensors, and RF module, and processors on a printed circuit board (PCB) fit within plastic housing.
Figure 2:
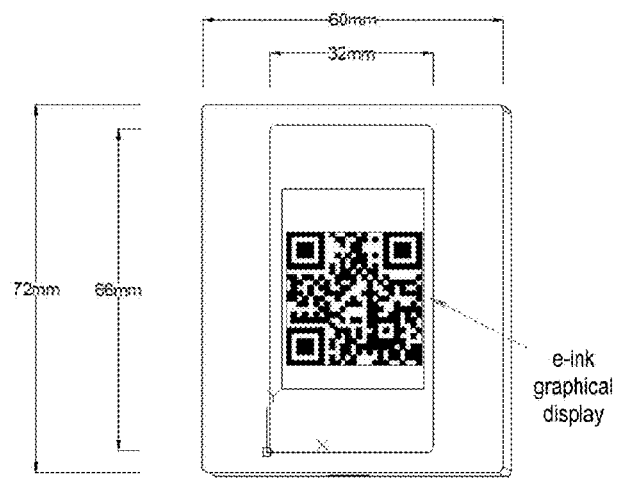
FIG. 2 illustrates a line drawing of one embodiment of the device with dimensions for plastic tooling, press button switch placement, and display fitting.
Figure 3:
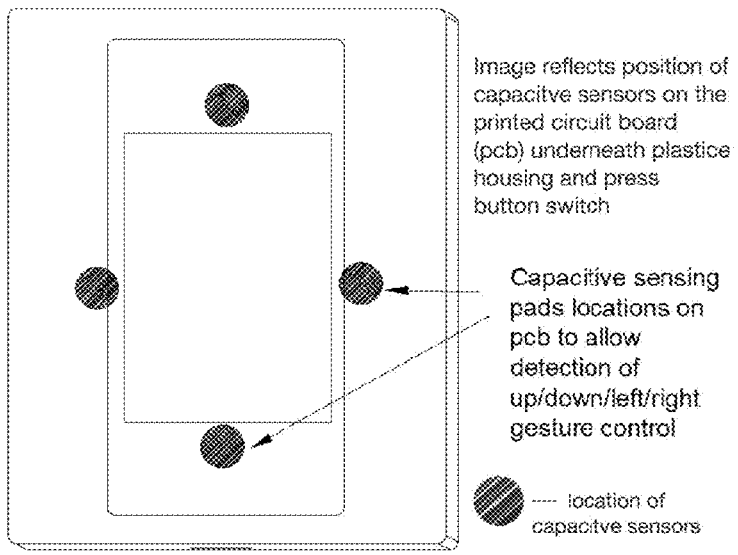
FIG. 3 illustrates the capacitive sensors placement from the front view of the device. Capacitive sensors on the printed circuit board (pcb) can recognize and identify gesture controls that select and toggle options and controls for lighting systems and mechanical systems and different performance data displays.
Figures 4, 5:
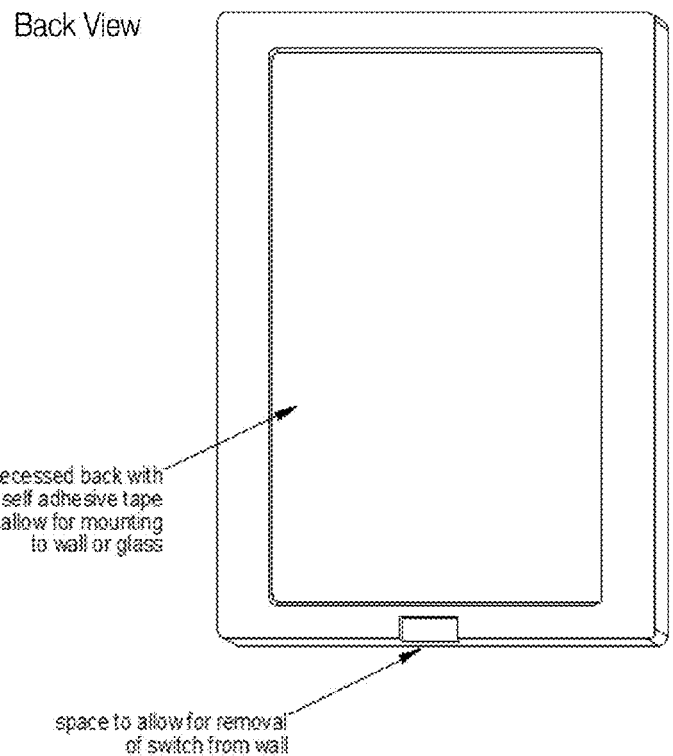
FIG. 4 illustrates the device back view. The backside of the plastic housing is designed to mount on any surface with different adhesives. Certain embodiments of the device with included battery power can install anywhere on any surface without any connected wires.
FIG. 5 illustrates the side view of one embodiment of the device with rocker switch press-buttons extending beyond the depth of the plastic housing.
Figure 6:
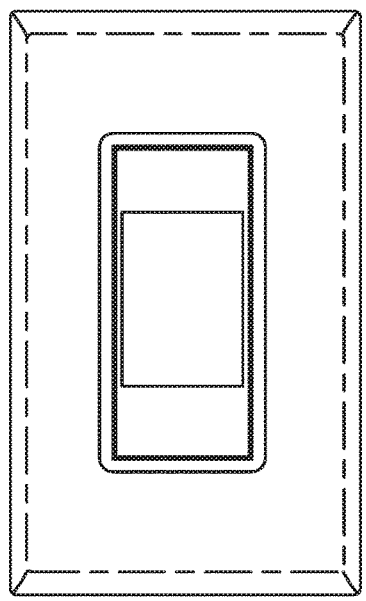
FIG. 6 illustrates the device's display screen during default mode. When there is no gesture/swipe or press-button input after a period of time, the plain white "OFF" screen on the display allows the device to look like a generic rocker light switch matching any residential, retail, commercial or industrial building space. Press-button input from this default position will turn programmed and connected light fixtures "ON" or "OFF" or to the programmed light level.
Figure 7:
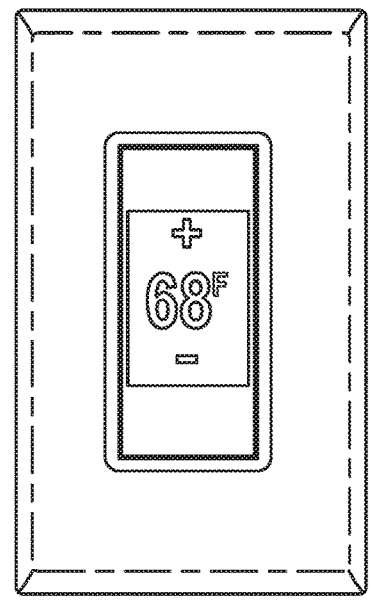
FIG. 7 illustrates the device display screen during initial gesture/swipe or press button input. The Set Point command for Air Conditioning or Heat is displayed with a plus and minus symbol corresponding to the press-button inputs.
Figure 8:
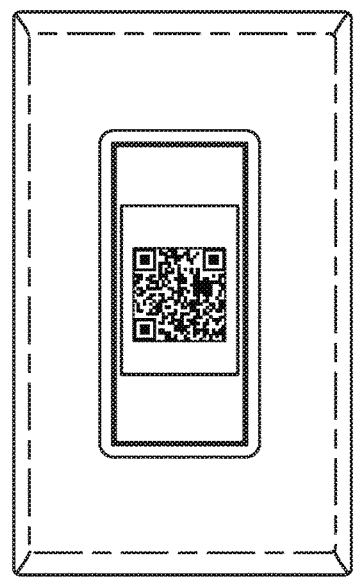
FIG. 8 illustrates the device display screen during "Programming mode." A QR code that corresponds to the device's serial number is displayed so that point-and-click commissioning can proceed wirelessly linking the device to light fixtures, HVAC mechanical systems, and more.
Figure 9:
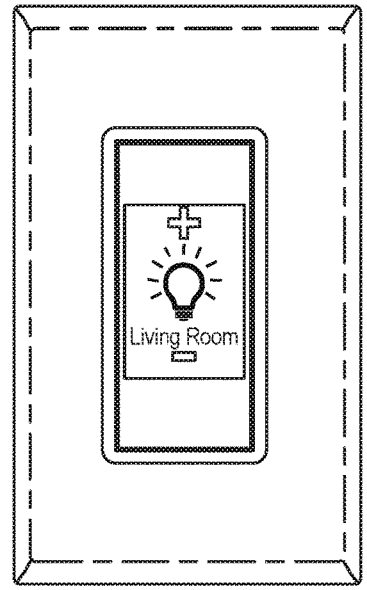
FIG. 9 illustrates an example of the display on the device in "Lighting mode." A light bulb and label are displayed with plus and minus symbol corresponding to the press-button controls for dimmer settings, in the case for "Living Room."
Figure 10:
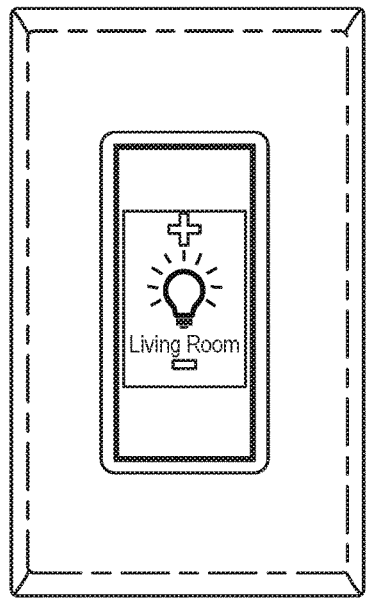
FIG. 10 illustrates another example of the display on the device in "Lighting mode." A light bulb and label are displayed with plus and minus symbol corresponding to the press-button controls for dimmer settings, in the case for "Kitchen."
Figure 11:
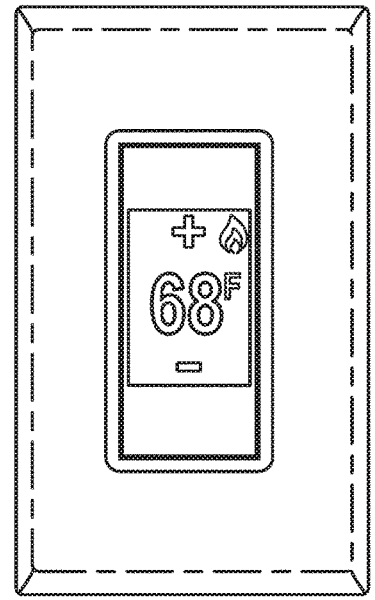
FIG. 11 illustrates the display on the device for "Heating mode." The temperature set point and a heat icon are displayed. The plus and minus symbols correspond to the press-button inputs and, with different software coding from other modes, in "Heating mode" will control boiler controls, or forced air heat controls, or similarly related heat controls for building heat and climate control.
Figure 12:
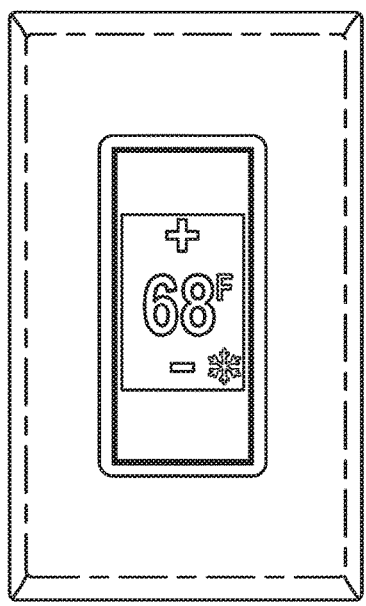
FIG. 12 illustrates the display on the device for "Cooling mode." The temperature set point and an Air Conditioning icon are displayed. The plus and minus symbols correspond to the press-button inputs and, with different software coding from other modes, in "Cooling mode" will control Air Conditioner setting, or swamp cooler controls, or similarly related cooling controls for building cooling and climate control.
Figure 13:
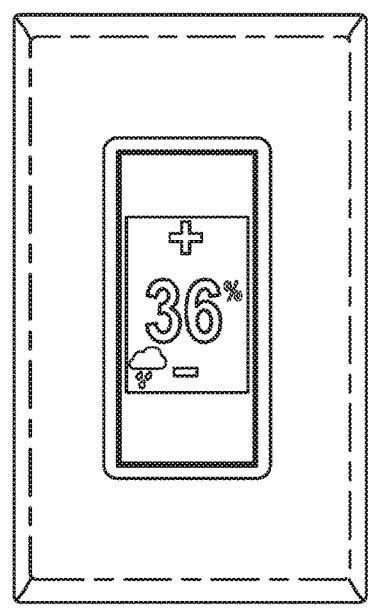
FIG. 13 illustrates the display on the device for "Humidity mode." The humidity set point and a humidity icon are displayed. The plus and minus symbols correspond to the press-button inputs and, with different software coding from other modes, in "Humidity mode" will control dehumidifier settings, humidifier settings, swamp cooler controls, or similarly related humidity controls for building cooling and climate control.
Figure 14:
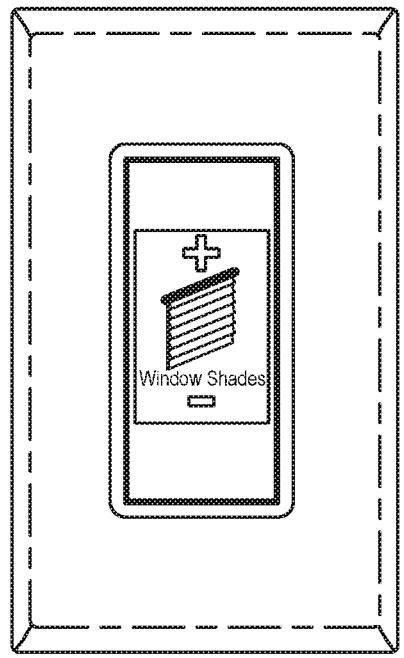
FIG. 14 illustrates the display on the device for "Window Shades mode." A window shade icon and plus and minus symbols correspond to the press-button inputs. With different software coding from other modes, in "Window Shade mode" will control motorized window shades during bright and shady times of the day. The "Window Shade mode" in some embodiments, can be programmed to work with lighting modes, heating, and cooling modes to maximize use of available daylight in different seasons for optimized building comfort.
Figure 15:
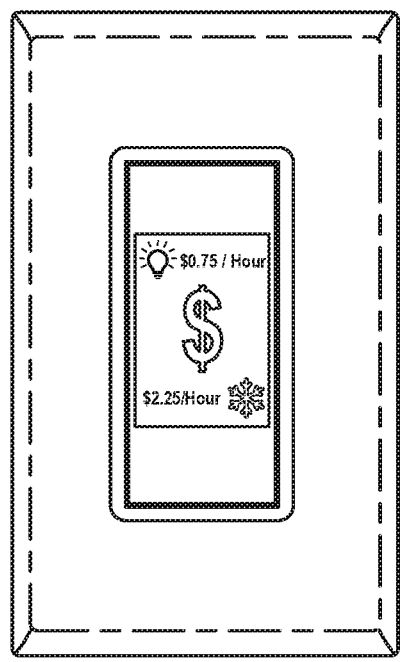
FIG. 15 illustrates the display on the device for "Spending mode." A currency symbol is shown with other icons from cooling mode and lighting modes (in this example) to show estimated dollars per hour spending rate.
Figure 16:
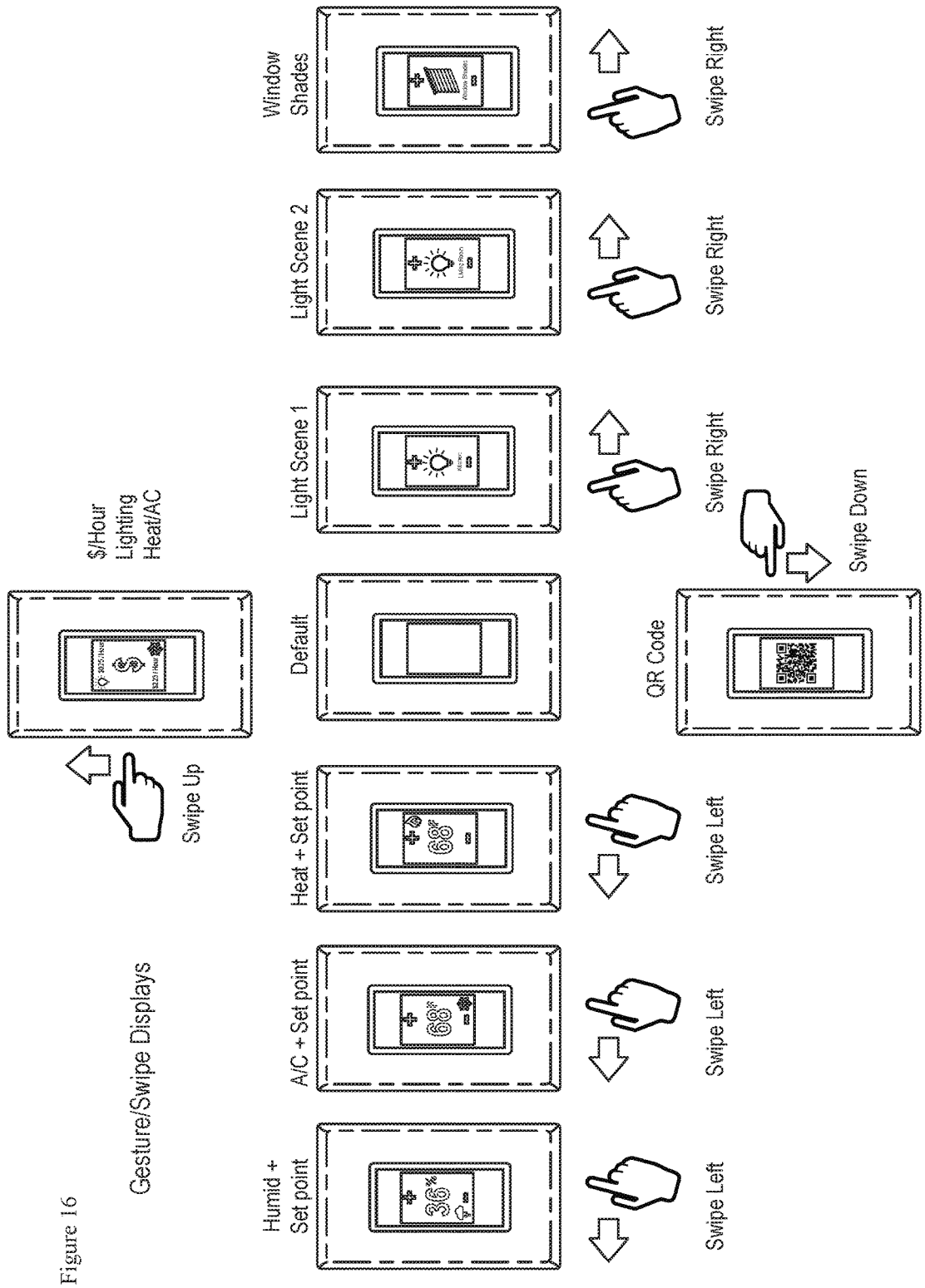
FIG. 16 illustrates a user's interaction with one embodiment of the device and display. The figure illustrates swipe/gesture inputs being used to access different modes, controls, and displays on the device. Gesture/swipe inputs do not require the display to be physically touched, instead capacitive sensors fitted to the printed circuit board inside the plastic housing can be programmed to respond when the users hand is within a specific distance from the device to minimize the chance of unintended interactions. This figure illustrates one embodiment of the device used for lighting, HVAC, shades, cost prediction, and programming. See FIG. 18 for a general illustration on another embodiments and broadly de

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

The device disclosed herein has several aspects, no single one of which is solely responsible for their desirable attributes. Without limiting the scope of the claims, some prominent features will now be discussed briefly. Numerous other embodiments are also contemplated, including embodiments that have fewer, additional, and/or different components, steps, features, objects, benefits, and advantages. The components, aspects, and steps may also be arranged and ordered differently. After considering this discussion, one will understand how the features of the devices and methods disclosed herein can provide advantages over other known devices and methods.

Some embodiments relate to a device with a radio frequency antenna, microprocessor, and computer memory designed to function as a multi-purpose switch, data display, meter, monitor, and control for lamps, light fixtures, dimmers, drivers, boilers, domestic hot water tanks, air conditioners, swamp coolers, solar hot water systems, PV solar systems, fans, humidifiers, de-humidifiers, zone valve controllers, light sensors, motion sensors, and more.

Some embodiments of the device display the user's real-time cost for a specific building system on the screen using software algorithms, which calculate performance data and fuel costs. Building systems' performance can then be displayed as a cost-per-hour data point on the display for instantaneous feedback and chances to alter the building behaviors.

One embodiment of the present disclosure relates to a completely wireless device powered by a battery power pack. The method for broadcasting radio frequency transmissions is allowed with use of a 6LoWPAN radio module or other radio frequency protocols, or other wireless communication protocols such as WiFi. In a battery powered version of the device, the radio transmissions are managed for low power operations.

In some embodiments, the device is powered by Class 2 low-voltage 24DC wires, and in some embodiments, the device is powered with 90-277VAC line voltage. In wire-powered versions the radio frequency transmission power is managed at normal power.

In some embodiments, the device connects with other devices over wireless mesh networks communicating via 6LoWPAN radio signal. The device generates targeted data transmissions for wireless control of other devices. In some embodiments, the device is associated with lighting devices with pre-set "ON/OFF" and dimming control. In some embodiments the device connects with other devices to control settings via 6LoWPAN radio signal, or other radio frequency protocols, or other wireless communication protocols such as WiFi.

In some embodiments, the device identifies other devices connected to the local wireless mesh network and identifies the function of the other devices as lighting, heating, cooling, humidity control, other HVAC controls, energy system controls, etc.

In some embodiments, the device is able to respond to gesture/swipe commands from users. Physical contact with the device is not required to control the device with gesture/swipe commands. In some embodiments, gesture/swipe commands direct the antenna module to broadcast and receive information, direct processor to analyze information, direct the display to show specific data or information, and computer memory to recall data and information.

In some embodiments, the device receives commands from press-button controls and assigns different responses for long-press and short-press commands. In some embodiments the short-press command will turn mechanical systems or lighting systems "ON" or "OFF. In some embodiments, short-press commands will change the set point in "Heating mode" or "cooling mode." In some embodiments, long-press commands will dim lighting systems up or down. In some embodiments, long-press commands will raise or lower thermostat set points up or down.

In some embodiments, the device connects with a border router to share information with other wirelessly connected devices and send and receive information to and from the Internet. The device may request storing information provided by the border router in computer memory designed to store information associating other device locations, performance data, and functional information.

Embodiments of device described herein are designed to function as an electronic control and display, unique and novel to prior art, able to respond to gesture/swipe commands and display cost per hour performance data for building systems. Certain embodiments of the device are fitted with 6LoWPAN wireless radio frequency communication modules able to meter, monitor, and control HVAC, water heating, lighting systems, and other mechanical and hydronic systems. In some embodiments the device communicates over other radio frequency protocols, or other wireless communication protocols such as WiFi. In some embodiments, performance data and controls are displayed on the device's integrated, gesture activated, black-and-white, display. The device can be used as a multi-purpose switch, data display, meter, monitor, and control for lamps, light fixtures, dimmers, drivers, boilers, domestic hot water tanks, solar hot water systems, PV solar systems, fans, de-humidifiers, zone valve controllers, light sensors, motion sensors, and more.

Certain embodiments of the device will display real-time user costs on the screen, calculated with software-based algorithms, for any specific building system in use and connected to the device. Real-time user costs are calculated to show the performance of building systems and determine a cost-per-hour data point, which is displayed on the screen.

Certain embodiments of the device control "ON/OFF" switching of lighting devices, heating devices, cooling devices, humidity controls devices, building energy systems, window shades, projection screens, fans, mechanical controls, zone valve controls, hydronic system controls and more. The device can be configured to identify the function, location, and performance of different systems through wireless commissioning, and wireless radio frequency data transmissions.

Certain embodiments of the device are programmed with corresponding and related software applications. Software is used in certain embodiments to program menus, program scenes, connect controllers, specify connected systems, set detailed controls of the device, commission the device and modify the device settings. Related software applications are accessible from internet-connected computers, tablets, smartphones and other devices.

Figure 17:
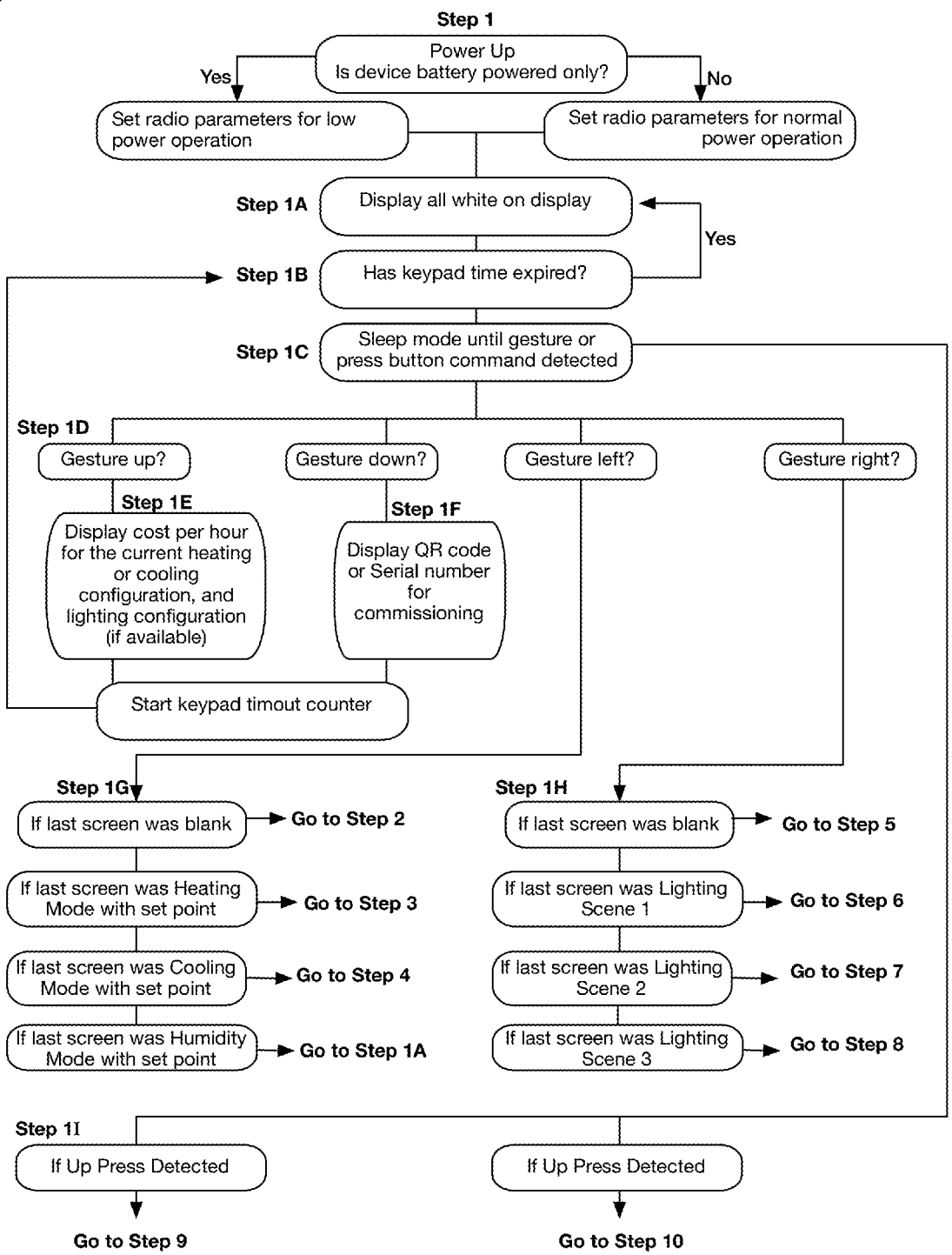
FIG. 17 is a flow chart illustrating one embodiment of the device designed to work with a software program in some embodiments accessed through a corresponding web-based and mobile application which allows for more precise controls, settings, scenes. The step-by-step flow chart describing one embodiment of software programming is included in the detailed description below.
Figure 17:
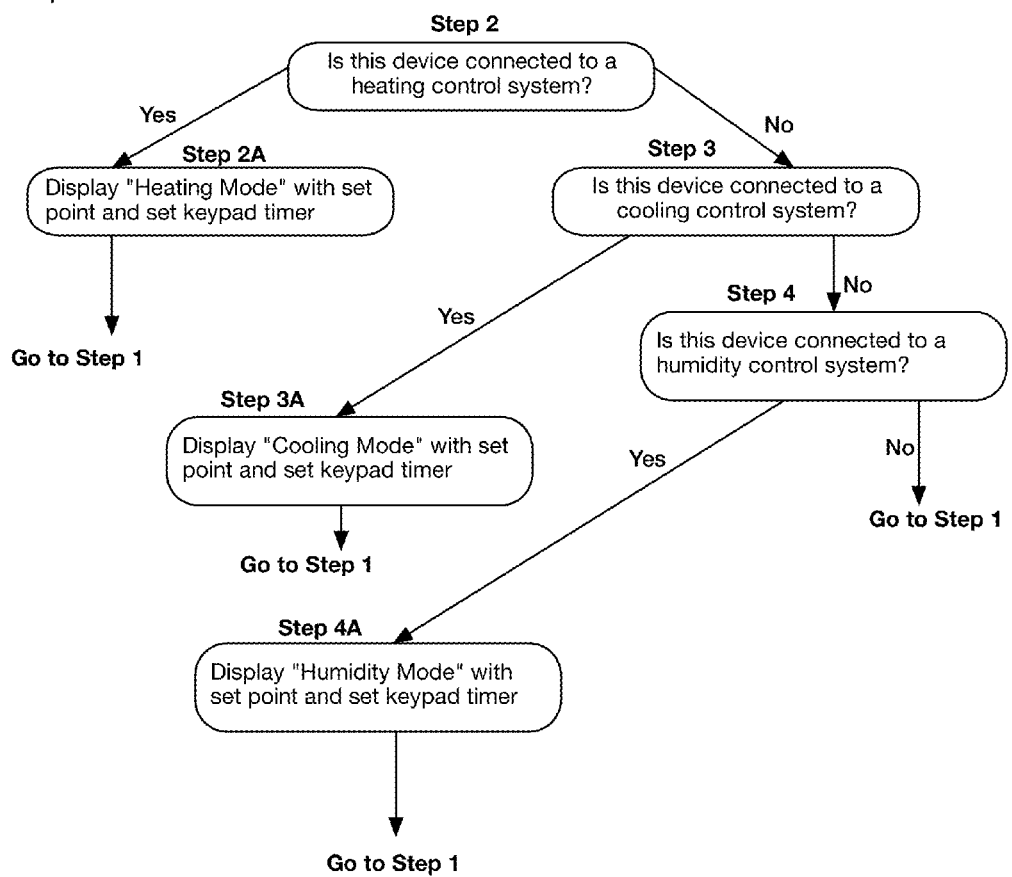
Figure 17:
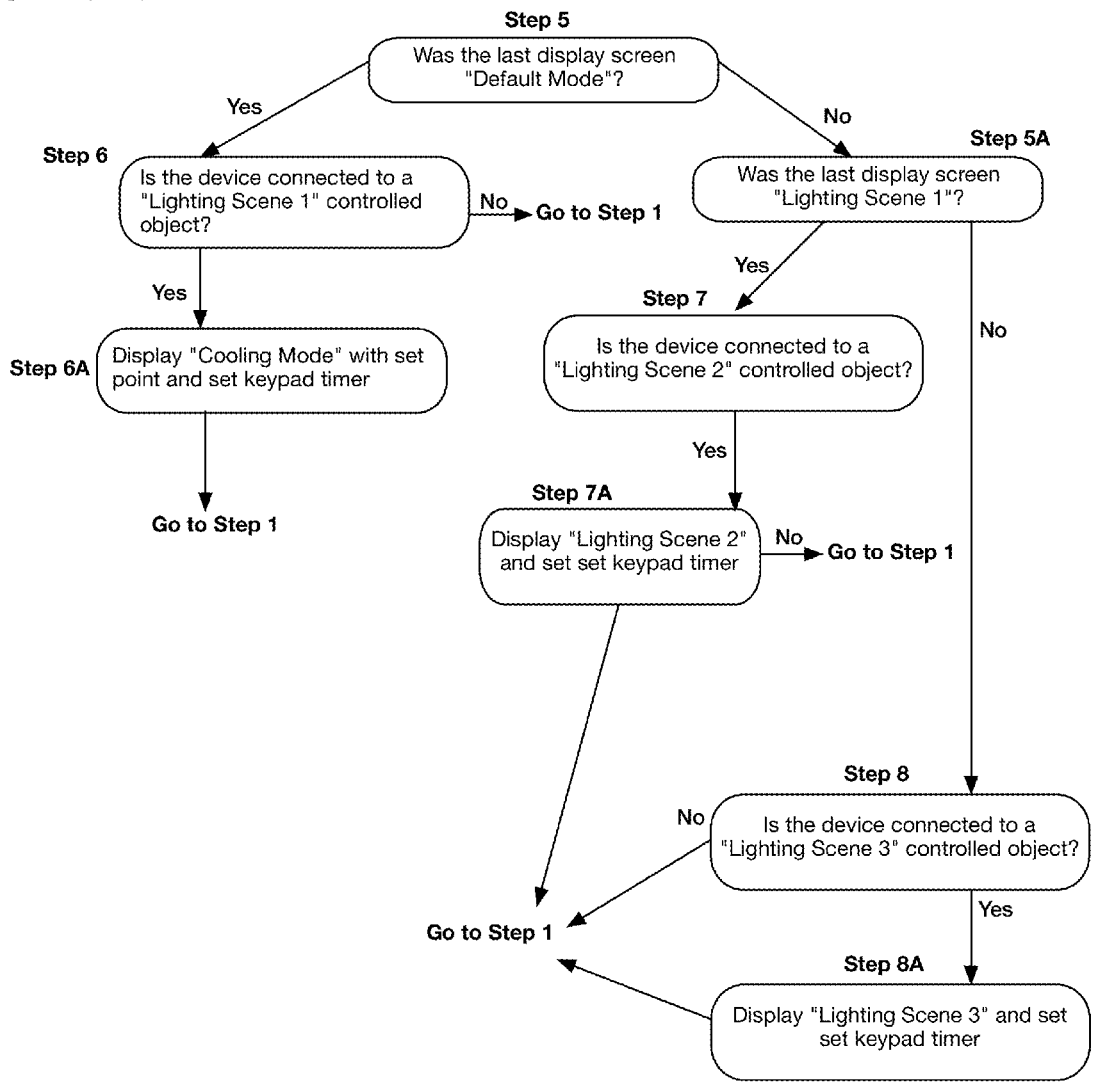
Figure 17:
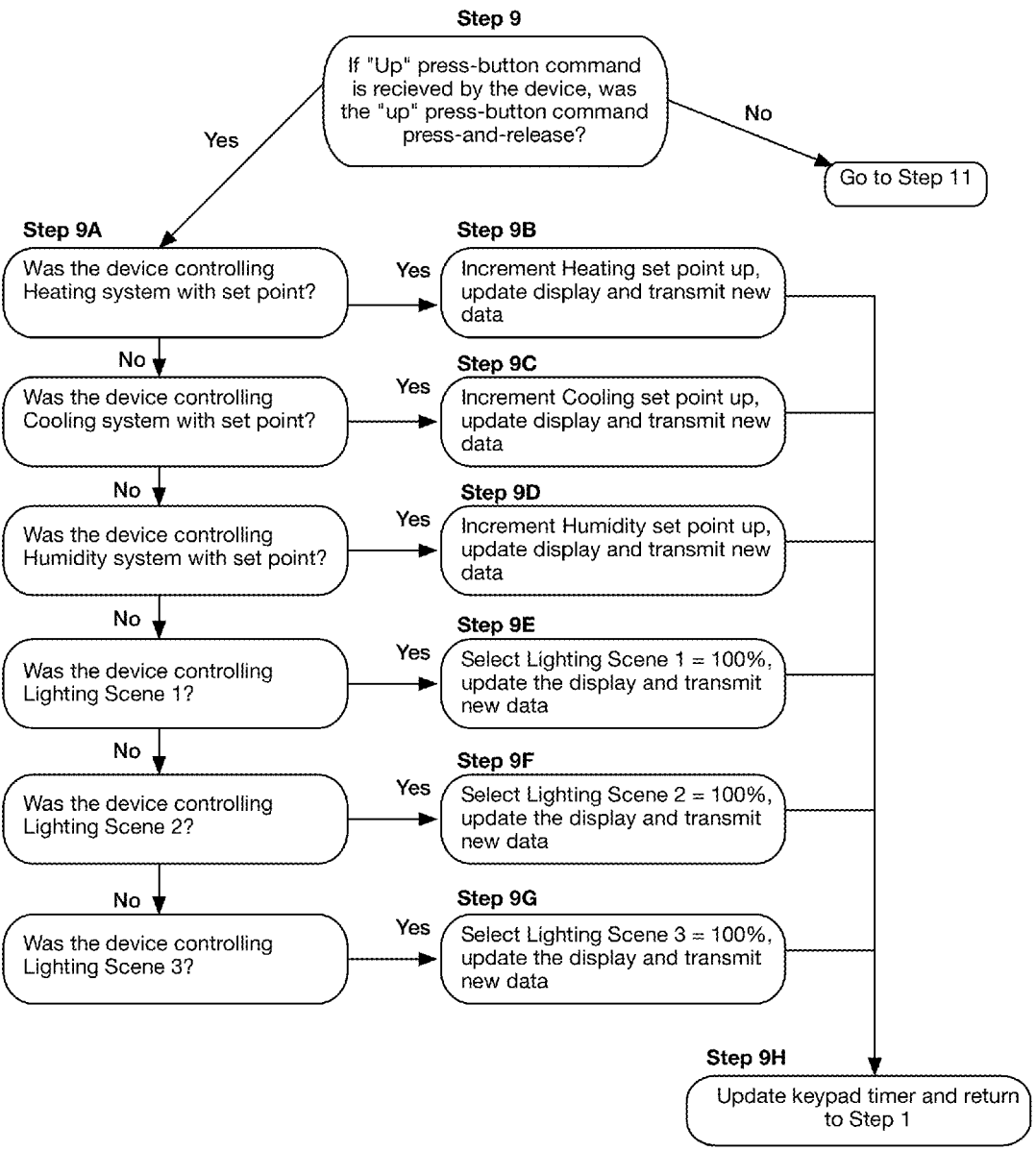
Figure 17:
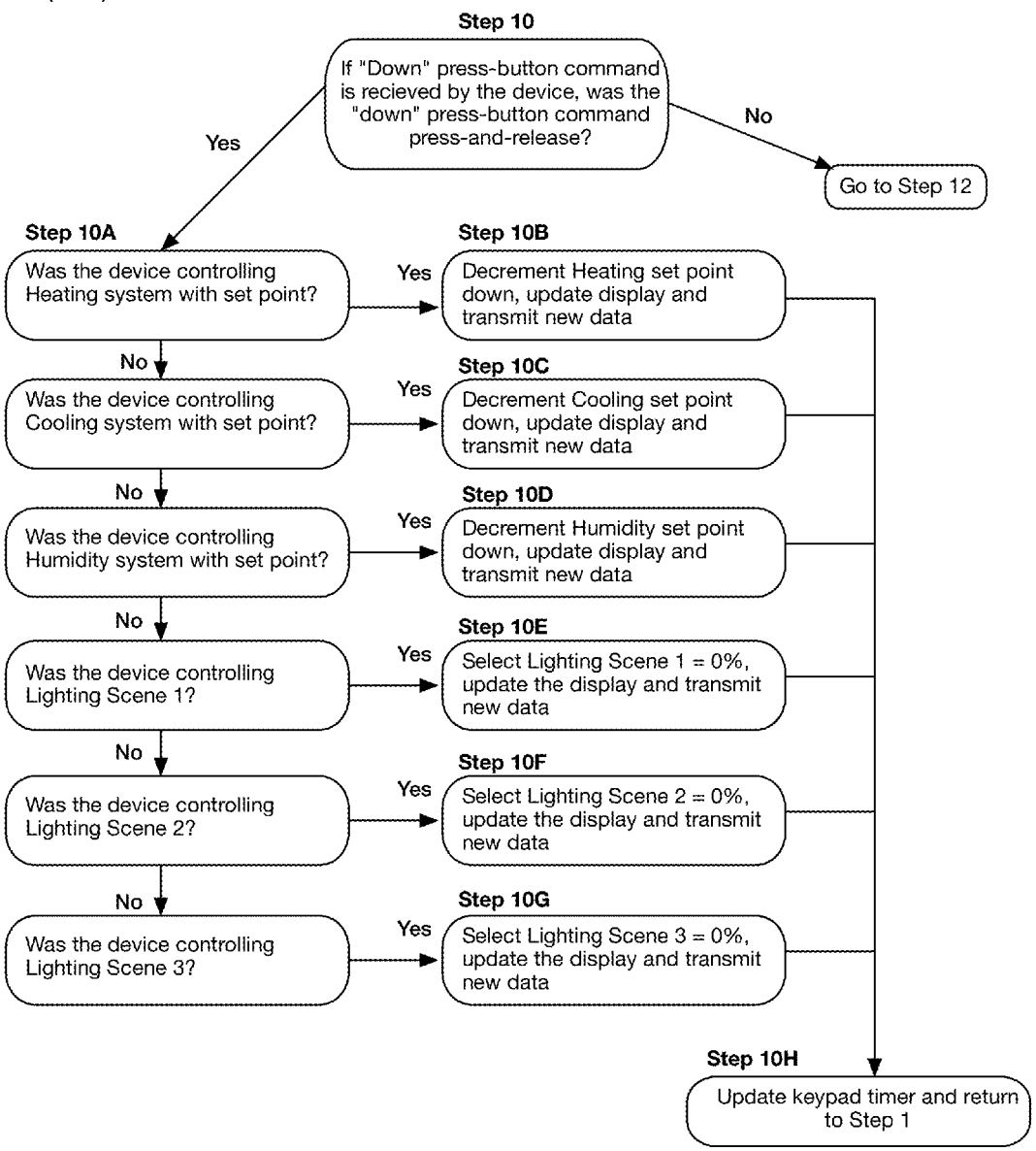
Figure 17:
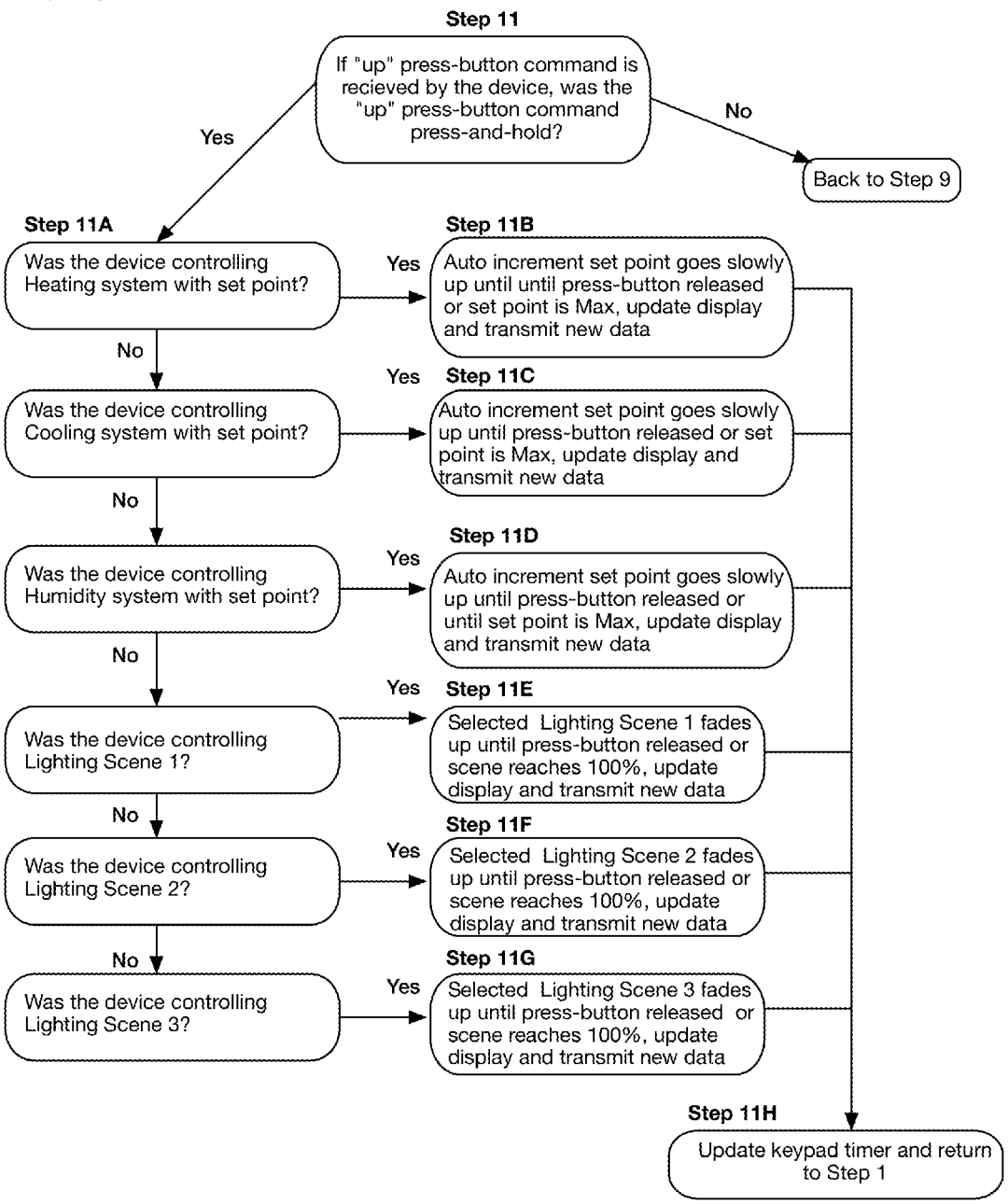
Figure 17:
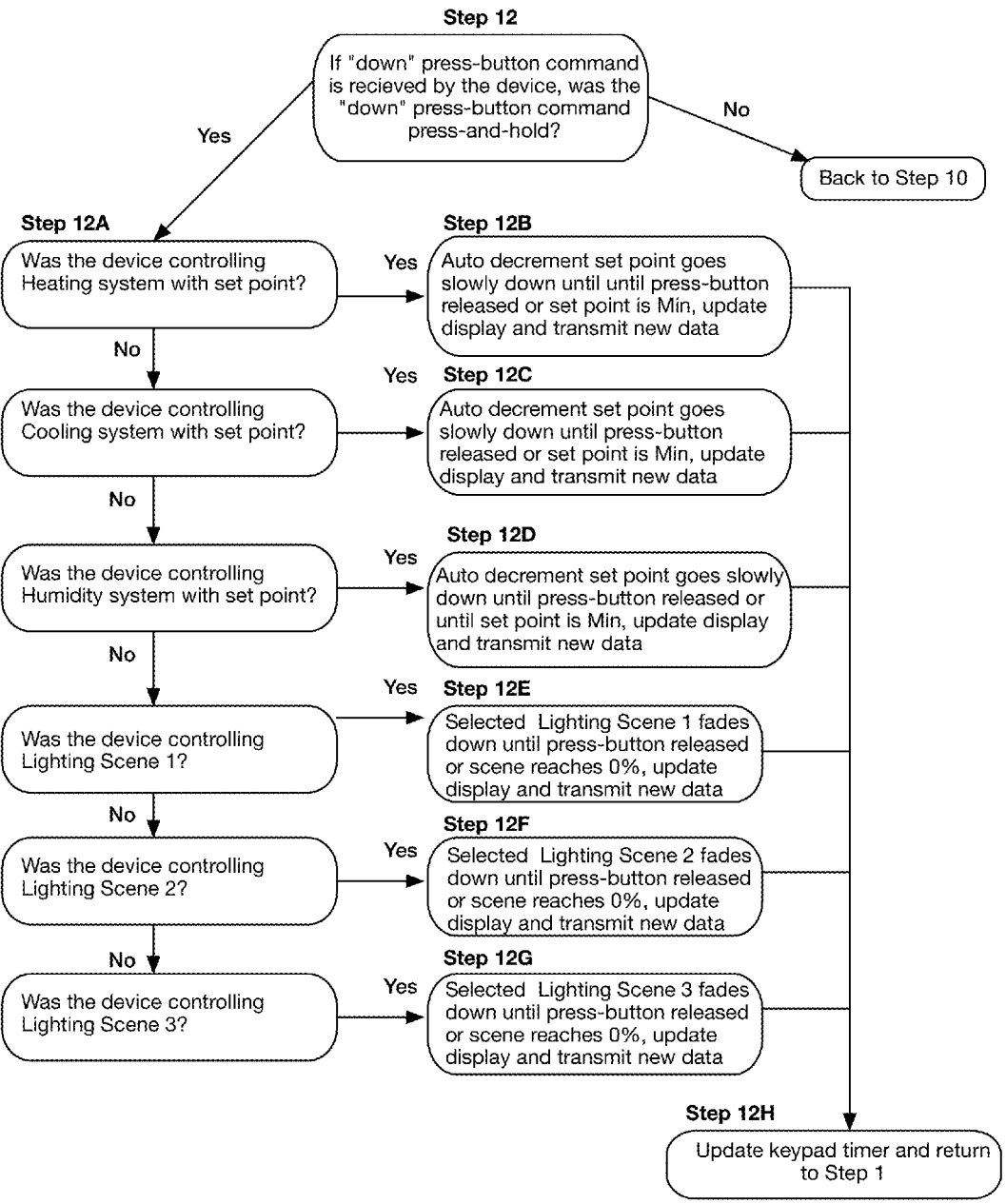
Figure 18:
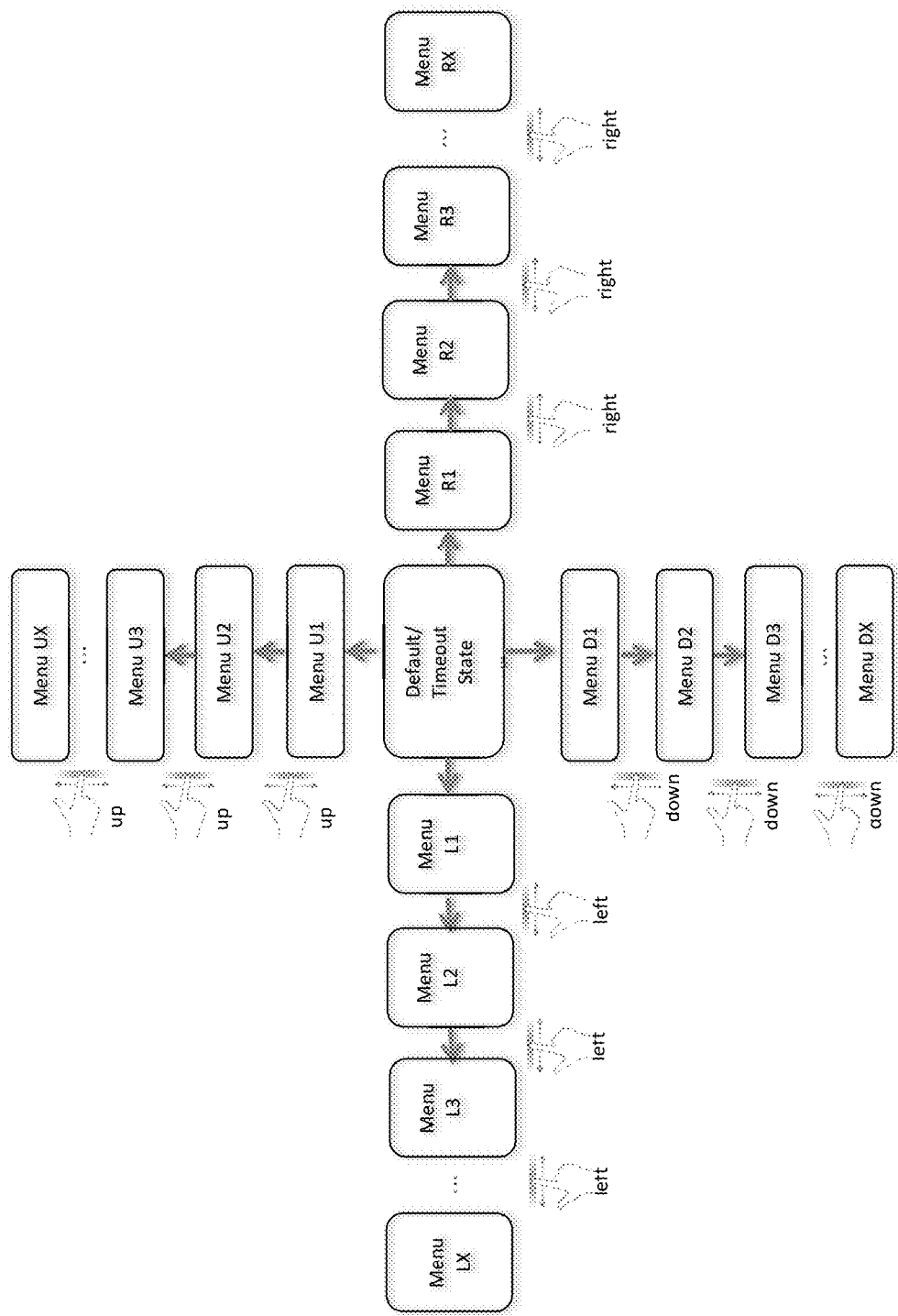
FIG. 18 illustrates a user's interaction with one embodiment of the device and display accessing general menus, modes, controls, and displays on the device with gesture/swipe inputs. Capacitive sensors fitted to the printed circuit board inside the plastic housing can be programmed to respond when the users hand is within a specific distance from the device to minimize the chance of unintended interactions.

With reference now to FIG. 17, a flowchart illustrating one embodiment of the device and the related software programming connecting to and controlling other devices via 6LoWPAN radio frequency messages or other radio frequency messages, or other wireless communication protocols such as WiFi. The process begins at Step 1: wherein the device is prepared, and in some embodiments, powered up exclusively with a battery power source. If the battery-powered version of the device is being used, the software code assigns radio frequency transmission parameters for low power operations. If a low-voltage or line-voltage version of the device is powered up, radio frequency transmission parameters are assigned normal power parameters. The process continues through Step 1.

Step 1A: Upon powering up the device display goes into "Default mode" displaying a plain white screen.

Step 1B: The devices re-enters default mode anytime the keypad timer reaches its programmed limit.

Step 1C: The device remains in "Default mode" or "Sleep mode" until a gesture/swipe command or a press-button command is recognized by the device. When a command is recognized, the process proceeds to Step 1D.

Step 1D: The capacitive sensors determine whether gesture/swipe input is received. If there is a "Swipe up" command recognized the process proceeds to Step 1E. If there is a "Swipe down" command recognized the process proceeds to Step 1F. If there is a "Swipe Left" command recognized the process proceeds to Step 1G. If there is a "Swipe up" command recognized the process proceeds to Step 1H.

Step 1E: When device recognizes a "Swipe up" command, the display shows cost-per-hour for the current heating or cooling configuration, and lighting configuration (if available). Software algorithms calculate the fuel costs from utility sources and metering data provided by other connected devices.

Step 1F: When device recognizes a "Swipe down" command, the display shows QR code or Serial number for commissioning mode (if available).

Step 1G: When device recognizes a "Swipe Left" command, if the display was previously showing a blank screen the process proceeds to Step 2; if the display was previously showing the "Heating mode" with set point, the process proceeds to Step 3; if the display was previously showing the "Cooling mode" with set point, the process proceeds to Step 4; if the display was previously showing the "Humidity mode" with set point, the process proceeds back to Step 1A.

Step 1H: When device recognizes a "Swipe Right" command, if the display was previously showing a blank screen the process proceeds to Step 5; if the display was previously showing the "Lighting Scene 1 mode," the process proceeds to Step 6; if the display was previously showing the "Lighting Scene 2 mode," the process proceeds to Step 7; if the display was previously showing the "Lighting Scene 3 mode," the process proceeds to Step 8.

Step 1I: If an "Up" press-button command is received, the process proceeds to Step 9. If a "Down" press-button command is received, the process proceeds to Step 10.

Step 2: If the device is connected to a heating control system the process proceeds to Step 2A. If there is no heating control system connected the process goes back to Step 1.

Step 2A: "Heating mode" is displayed on the screen along with the set point and the timer on the key timer begins running.

Step 3: If the device is connected to a cooling control system the process proceeds to Step 3A. If there is no cooling control system connected the process goes back to Step 1.

Step 3A: "Cooling mode" is displayed on the screen along with the set point and the timer on the key timer begins running.

Step 4: If the device is connected to a humidity control system the process proceeds to Step 4A. If there is no humidity control system connected the process goes back to Step 1.

Step 4A: "Humidity mode" is displayed on the screen along with the set point and the timer on the keypad timer begins running.

Step 5: If the last displayed screen on the device was "Default mode" the process proceeds to Step 6. If the last displayed screen on the device was not "Default mode" the process proceeds to Step 5A.

Step 5A: If the last displayed screen on the device was "Lighting Scene 1" the process proceeds to Step 7. If the last displayed screen on the device was not "Lighting Scene 1" the process proceeds to Step 8.

Step 6: If the device is connected to a "Lighting Scene 1" controlled object the process proceeds to Step 6A. If the device is not connected to a "Lighting Scene 1" controlled object the process goes back to Step 1.

Step 6A: The device display shows "Lighting Scene 1" and the timer on the keypad timer begins running Upon expiration of the keypad timer, the process goes back to Step 1.

Step 7: If the device is connected to a "Lighting Scene 2" controlled object the process proceeds to Step 7A. If the device is not connected to a "Lighting Scene 1" controlled object the process goes back to Step 1.

Step 7A: The device display shows "Lighting Scene 2" and the timer on the keypad timer begins running Upon expiration of the keypad timer, the process goes back to Step 1.

Step 8: If the device is connected to a "Lighting Scene 3" controlled object the process proceeds to Step 8A. If the device is not connected to a "Lighting Scene 3" controlled object the process goes back to Step 1.

Step 8A: The device display shows "Lighting Scene 3" and the timer on the keypad timer begins running Upon expiration of the keypad timer, the process goes back to Step 1.

Step 9: When device recognizes an "up" press-button command, if the "up" press-button command is a press-and-release command (short press), the process proceeds to Step 9A. If the command is a press-and-hold command (not a press-and-release command) the process proceeds to Step 11.

Step 9A: If the device is controlling a heating system controller and displaying "Heating mode" the process proceeds to Step 9B. If the device is controlling a cooling system controller and displaying "Cooling mode" the process proceeds to Step 9C. If the device is controlling a humidity system controller and displaying "Humidity mode" the process proceeds to Step 9D. If the device is controlling a lighting system controller and displaying "Lighting Scene 1" the process proceeds to Step 9E. If the device is controlling a lighting system controller and displaying "Lighting Scene 2" the process proceeds to Step 9F. If the device is controlling a lighting system controller and displaying "Lighting Scene 3" the process proceeds to Step 9G.

Step 9B: If the device is controlling a heating system controller and displaying "Heating mode," the "up" press-and-release command sends a wireless command to raise the heating system set point up by an increment and the device sends updated data via wireless mesh network to the connected border router (if available). The process then proceeds to Step 9H.

Step 9C: If the device is controlling a cooling system controller and displaying "Cooling mode," the "up" press-and-release command sends a wireless command to raise the cooling system set point up by an increment and the device sends updated data via wireless mesh network to the connected border router (if available). The process then proceeds to Step 9H.

Step 9D: If the device is controlling a humidity system controller and displaying "Humidity mode," the "up" press-and-release command sends a wireless command to raise the humidity system set point up by an increment and the device sends updated data via wireless mesh network to the connected border router (if available). The process then proceeds to Step 9H.

Step 9E: If the device is controlling a lighting system controller and displaying "Lighting Scene 1," the "up" press-and-release command sends a wireless command to raise the connected lighting scene to 100% and the device sends updated data via wireless mesh network to the connected border router (if available). The process then proceeds to Step 9H.

Step 9F: If the device is controlling a lighting system controller and displaying "Lighting Scene 2," the "up" press-and-release command sends a wireless command to raise the connected lighting scene to 100% and the device sends updated data via wireless mesh network to the connected border router (if available). The process then proceeds to Step 9H.

Step 9G: If the device is controlling a lighting system controller and displaying "Lighting Scene 3," the "up" press-and-release command sends a wireless command to raise the connected lighting scene to 100% and the device sends updated data via wireless mesh network to the connected border router (if available). The process then proceeds to Step 9H.

Step 9H: Device keypad timer is reset and the process returns to Step 1.

Step 10: When device recognizes a "down" press-button command, if the "down" press-button command is a press-and-release command (short press), the process proceeds to Step 10A. If the command is a press-and-hold command (not a press-and-release command) the process proceeds to Step 12.

Step 10A: If the device is controlling a heating system controller and displaying "Heating mode" the process proceeds to Step 10B. If the device is controlling a cooling system controller and displaying "Cooling mode" the process proceeds to Step 10C. If the device is controlling a humidity system controller and displaying "Humidity mode" the process proceeds to Step 10D. If the device is controlling a lighting system controller and displaying "Lighting Scene 1" the process proceeds to Step 10E. If the device is controlling a lighting system controller and displaying "Lighting Scene 2" the process proceeds to Step 10F. If the device is controlling a lighting system controller and displaying "Lighting Scene 3" the process proceeds to Step 10G.

Step 10B: If the device is controlling a heating system controller and displaying "Heating mode," the "down" press-and-release command sends a wireless command to lower the heating system set point down by an increment and the device sends updated data via wireless mesh network to the connected border router (if available). The process then proceeds to Step 10H.

Step 10C: If the device is controlling a cooling system controller and displaying "Cooling mode," the "down" press-and-release command sends a wireless command to lower the cooling system set point down by an increment and the device sends updated data via wireless mesh network to the connected border router (if available). The process then proceeds to Step 10H.

Step 10D: If the device is controlling a humidity system controller and displaying "Humidity mode," the "down" press-and-release command sends a wireless command to lower the humidity system set point down by an increment and the device sends updated data via wireless mesh network to the connected border router (if available). The process then proceeds to Step 10H.

Step 10E: If the device is controlling a lighting system controller and displaying "Lighting Scene 1," the "down" press-and-release command sends a wireless command to lower the connected lighting scene to 0% and the device sends updated data via wireless mesh network to the connected border router (if available). The process then proceeds to Step 10H.

Step 10F: If the device is controlling a lighting system controller and displaying "Lighting Scene 2," the "down" press-and-release command sends a wireless command to lower the connected lighting scene to 0% and the device sends updated data via wireless mesh network to the connected border router (if available). The process then proceeds to Step 10H.

Step 10G: If the device is controlling a lighting system controller and displaying "Lighting Scene 3," the "down" press-and-release command sends a wireless command to lower the connected lighting scene to 0% and the device sends updated data via wireless mesh network to the connected border router (if available). The process then proceeds to Step 10H.

Step 10H: Device keypad timer is reset and the process returns to Step 1.

Step 11: Device recognizes an "up" press-button command, and the "up" press-button command is a press-and-hold command (long press), the process proceeds to Step 11A.

Step 11A: If the device is controlling a heating system controller and displaying "Heating mode" the process proceeds to Step 11B. If the device is controlling a cooling system controller and displaying "Cooling mode" the process proceeds to Step 11C. If the device is controlling a humidity system controller and displaying "Humidity mode" the process proceeds to Step 11D. If the device is controlling a lighting system controller and displaying "Lighting Scene 1" the process proceeds to Step 11E. If the device is controlling a lighting system controller and displaying "Lighting Scene 2" the process proceeds to Step 11F. If the device is controlling a lighting system controller and displaying "Lighting Scene 3" the process proceeds to Step 11G.

Step 11B: If the device is controlling a heating system controller and displaying "Heating mode," the "up" press-and-hold command sends a wireless command to raise the heating system set point raises up slowly by a set increment until press-button is released or maximum set point is reached, at which point a stop command is sent. The device sends updated data via wireless mesh network to the connected border router (if available). The process then proceeds to Step 11H.

Step 11C: If the device is controlling a cooling system controller and displaying "Cooling mode," the "up" press-and-hold command sends a wireless command to raise the cooling system set point raises up slowly by a set increment until press-button is released or maximum set point is reached, at which point a stop command is sent. The device sends updated data via wireless mesh network to the connected border router (if available). The process then proceeds to Step 11H.

Step 11D: If the device is controlling a humidity system controller and displaying "Humidity mode," the "up" press-and-hold command sends a wireless command to raise the humidity system set point raises up slowly by a set increment until press-button is released or maximum set point is reached, at which point a stop command is sent. The device sends updated data via wireless mesh network to the connected border router (if available). The process then proceeds to Step 11H.

Step 11E: If the device is controlling a lighting system controller and displaying "Lighting Scene 1," the "up" press-and-hold command sends a wireless command to fade the lighting system up slowly by a set increment until press-button is released or maximum set point is reached, at which point a stop command is sent. The device sends updated data via wireless mesh network to the connected border router (if available). The process then proceeds to Step 11H.

Step 11F: If the device is controlling a lighting system controller and displaying "Lighting Scene 2," the "up" press-and-hold command sends a wireless command to fade the lighting system up slowly by a set increment until press-button is released or maximum set point is reached, at which point a stop command is sent. The device sends updated data via wireless mesh network to the connected border router (if available). The process then proceeds to Step 11H.

Step 11G: If the device is controlling a lighting system controller and displaying "Lighting Scene 3," the "up" press-and-hold command sends a wireless command to fade the lighting system up slowly by a set increment until press-button is released or maximum set point is reached, at which point a stop command is sent. The device sends updated data via wireless mesh network to the connected border router (if available). The process then proceeds to Step 11H.

Step 11H: Device keypad timer is reset and the process returns to Step 1.

Step 12: Device recognizes an "down" press-button command, and the "down" press-button command is a press-and-hold command (long press), the process proceeds to Step 12A.

Step 12A: If the device is controlling a heating system controller and displaying "Heating mode" the process proceeds to Step 12B. If the device is controlling a cooling system controller and displaying "Cooling mode" the process proceeds to Step 12C. If the device is controlling a humidity system controller and displaying "Humidity mode" the process proceeds to Step 12D. If the device is controlling a lighting system controller and displaying "Lighting Scene 1" the process proceeds to Step 12E. If the device is controlling a lighting system controller and displaying "Lighting Scene 2" the process proceeds to Step 12F. If the device is controlling a lighting system controller and displaying "Lighting Scene 3" the process proceeds to Step 12G.

Step 12B: If the device is controlling a heating system controller and displaying "Heating mode," the "down" press-and-hold command sends a wireless command to lower the heating system set point lowers down slowly by a set increment until press-button is released or minimum set point is reached, at which point a stop command is sent. The device sends updated data via wireless mesh network to the connected border router (if available). The process then proceeds to Step 12H.

Step 12C: If the device is controlling a cooling system controller and displaying "Cooling mode," the "down" press-and-hold command sends a wireless command to lower the cooling system set point lowers down slowly by a set increment until press-button is released or minimum set point is reached, at which point a stop command is sent. The device sends updated data via wireless mesh network to the connected border router (if available). The process then proceeds to Step 12H.

Step 12D: If the device is controlling a humidity system controller and displaying "Humidity mode," the "down" press-and-hold command sends a wireless command to lower the humidity system set point lowers down slowly by a set increment until press-button is released or minimum set point is reached, at which point a stop command is sent. The device sends updated data via wireless mesh network to the connected border router (if available). The process then proceeds to Step 12H.

Step 12E: If the device is controlling a lighting system controller and displaying "Lighting Scene 1," the "down" press-and-hold command sends a wireless command to dim the lighting system down slowly by a set increment until press-button is released or 0% level is reached, at which point a stop command is sent. The device sends updated data via wireless mesh network to the connected border router (if available). The process then proceeds to Step 12H.

Step 12F: If the device is controlling a lighting system controller and displaying "Lighting Scene 2," the "down" press-and-hold command sends a wireless command to dim the lighting system down slowly by a set increment until press-button is released or 0% level is reached, at which point a stop command is sent. The device sends updated data via wireless mesh network to the connected border router (if available). The process then proceeds to Step 12H.

Step 12G: If the device is controlling a lighting system controller and displaying "Lighting Scene 3," the "down" press-and-hold command sends a wireless command to dim the lighting system down slowly by a set increment until press-button is released or 0% level is reached, at which point a stop command is sent. The device sends updated data via wireless mesh network to the connected border router (if available). The process then proceeds to Step 12H.

Step 12H: Device keypad timer is reset and the process returns to Step 1.

Figure 19:
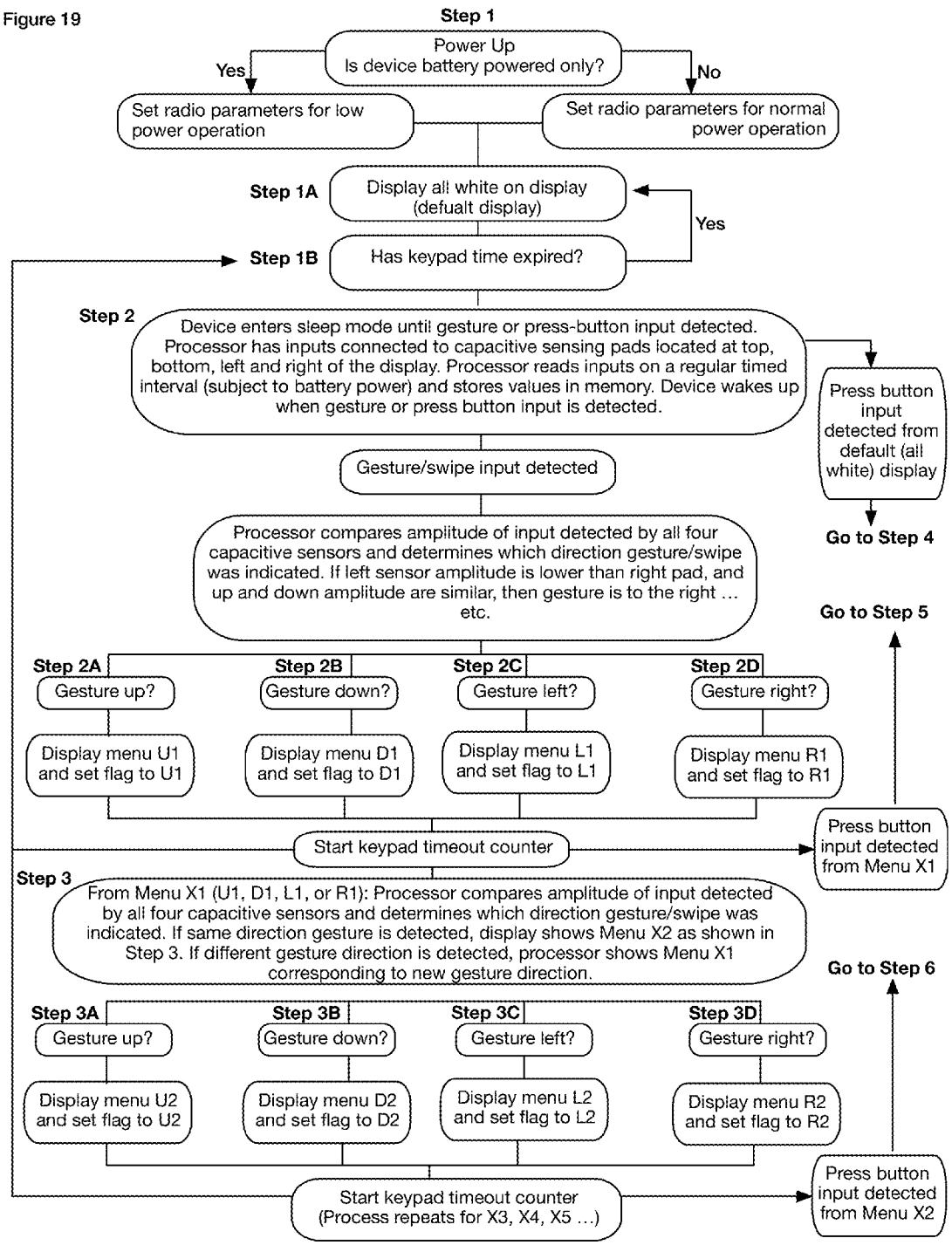
FIG. 19 is a flow chart illustrating one embodiment of the device designed to work with a software program in some embodiments accessed through a corresponding web-based and mobile application which allows for more precise controls, settings, scenes. The step-by-step flow chart describing one embodiment of software programming is included in the detailed description below.
Figure 19:
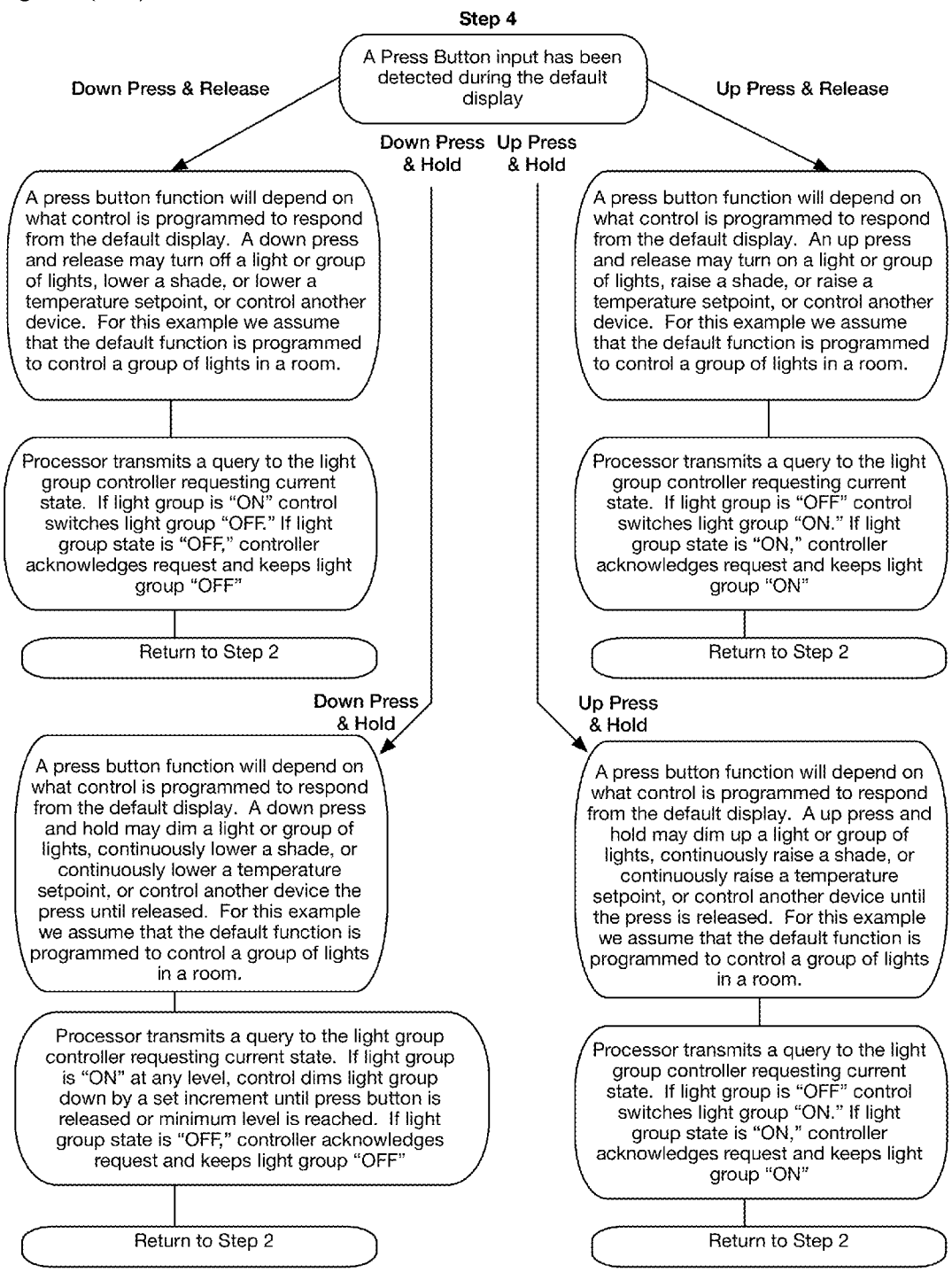
Figure 19:
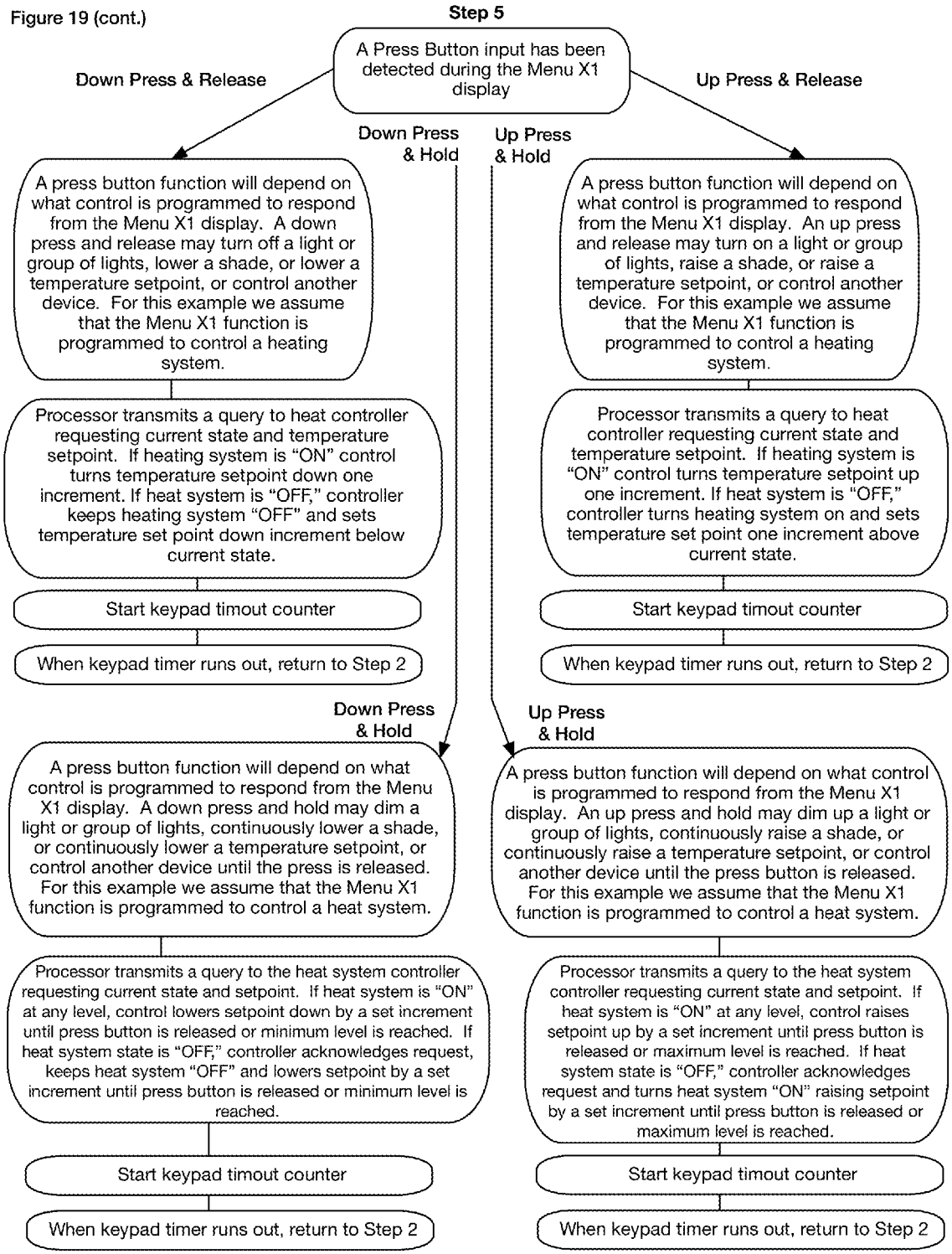
Figure 19:
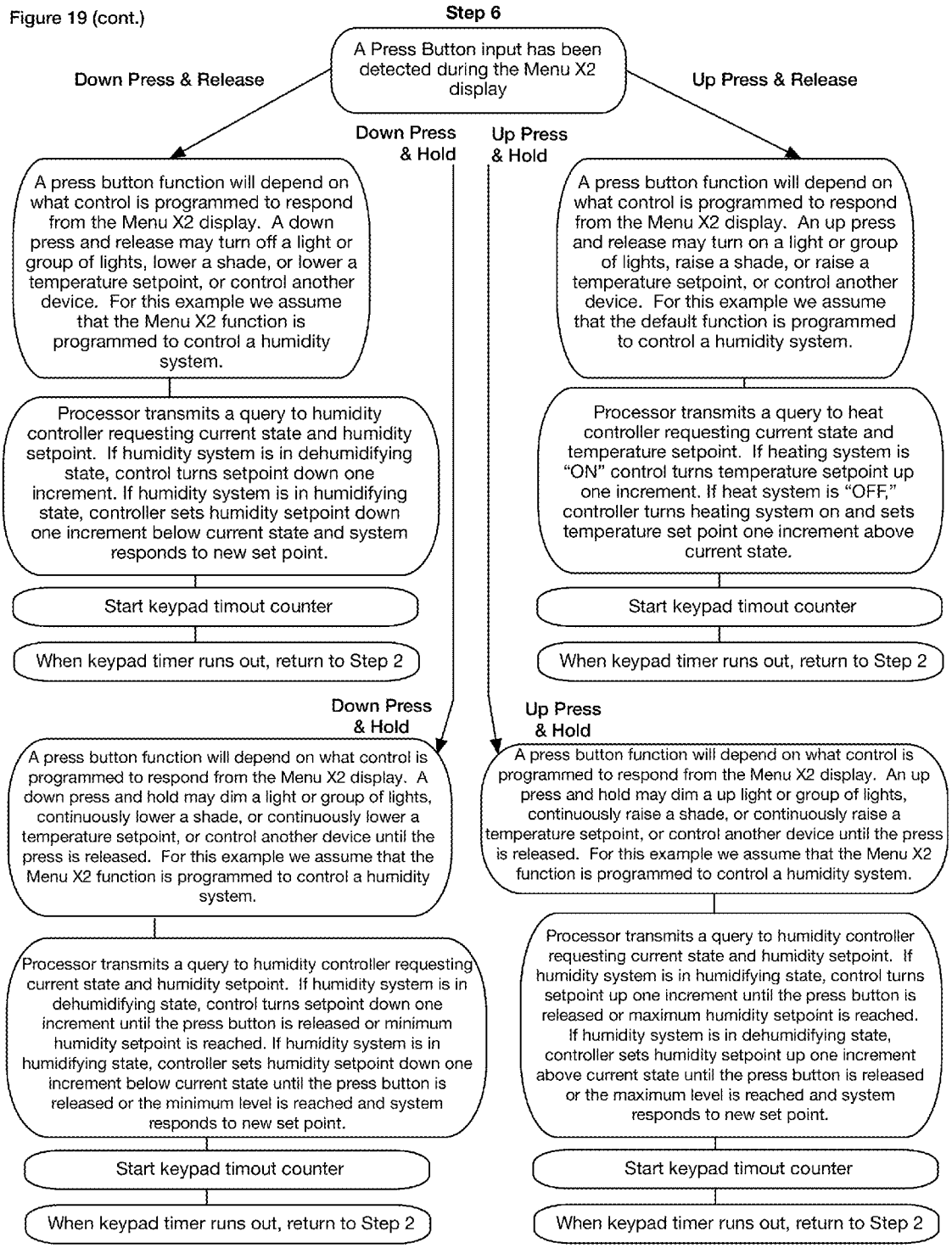

With reference now to FIG. 19, a flowchart illustrating one embodiment of the device and the related software programming connecting to and controlling other devices via 6LoWPAN radio frequency, or other radio frequency messages, or other wireless communication protocols such as WiFi. The process begins at Step 1: wherein the device is prepared, and in some embodiments, powered up exclusively with a battery power source. If the battery-powered version of the device is being used, the software code assigns radio frequency transmission parameters for low power operations. If a low-voltage or line-voltage version of the device is powered up, radio frequency transmission parameters are assigned normal power parameters. The process continues through Step 1.

Step 1A: The device shows a default display after being powered up. In some embodiments, the default display is an all-white screen. Alternative default displays can be programmed with corresponding software from a computer, tablet, smartphone or other device. However, a plain white screen is the factory default to highlight the simple and clean product design.

Step 1B: In some embodiments, the device's processor reverts back to the default screen after the keypad timer has reached the programmed limit.

Step 2: In some embodiments, the device enters sleep mode until a press-button or gesture input is recognized. While in sleep mode the device displays a default screen. If a press button command is detected while in default screen mode, the process proceeds to Step 4. If the device detects a gesture input, the process proceeds through Step 2. Depending on the amplitude of the gesture recognized by the capacitive sensors, the processor will deduce the intended direction of the gesture. In some embodiments, the processor compares the amplitude of input detected by all four capacitive sensors and determines which direction gesture/swipe was indicated. If the left capacitive sensor pad amplitude detected is lower than right capacitive sensor pad, and up and down amplitude are similar, then gesture is to the right. If the right capacitive sensor pad amplitude detected is lower than left capacitive sensor pad, and up and down amplitude are similar, then gesture is to the left. If the up capacitive sensor pad amplitude detected is lower than down capacitive sensor pad, and left and right amplitude are similar, then gesture is down. If the down capacitive sensor pad amplitude detected is lower than the up capacitive sensor pad, and left and right amplitude are similar, then gesture is up. The processor is able to calculate the intended gesture direction by comparing the amplitude input of all four capacitive sensors. Depending on the calculated input, the process proceeds to Step 2A, 2B, 2C, or 2D.

Step 2A: An "up" gesture is recognized by the device and the processor sets display to the U1 Menu. The processor flags U1 and stores the setting in the device's memory. In some embodiments, the device remembers the flagged menu and any following controls will be determined by inputs received while the flagged menu is displayed. The keypad timer starts after the last input is received. If the keypad timer expires, the process returns to Step 1B. If a press-button input is received while on menu U1 the process proceeds to Step 5. If another "up" gesture input is detected while on menu U1, the device displays the U2 menu. If a gesture is detected that is not an "up" gesture, the device displays the corresponding X1 Menu (D1, L1, or R1 in this case).

Step 2B: A "down" gesture is recognized by the device and the processor sets display to the D1 Menu. The processor flags D1 and stores the setting in the device's memory. In some embodiments, the device remembers the flagged menu and any following controls will be determined by inputs received while the flagged menu is displayed. The keypad timer starts after the last input is received. If the keypad timer expires, the process returns to Step 1B. If a press-button input is received while on menu D1 the process proceeds to Step 5. If another "down" gesture input is detected while on menu D1, the device displays the D2 menu. If a gesture is detected that is not a "down" gesture, the device displays the corresponding X1 Menu (U1, L1, or R1 in this case).

Step 2C: A "left" gesture is recognized by the device and the processor sets display to the L1 Menu. The processor flags L1 and stores the setting in the device's memory. In some embodiments, the device remembers the flagged menu and any following controls will be determined by inputs received while the flagged menu is displayed. The keypad timer starts after the last input is received. If the keypad timer expires, the process returns to Step 1B. If a press-button input is received while on menu L1 the process proceeds to Step 5. If another "left" gesture input is detected while on menu L1, the device displays the L2 menu. If a gesture is detected that is not a "left" gesture, the device displays the corresponding X1 Menu (U1, D1, or R1 in this case).

Step 2D: A "right" gesture is recognized by the device and the processor sets display to the R1 Menu. The processor flags R1 and stores the setting in the device's memory. In some embodiments, the device remembers the flagged menu and any following controls will be determined by inputs received while the flagged menu is displayed. The keypad timer starts after the last input is received. If the keypad timer expires, the process returns to Step 1B. If a press-button input is received while on menu R1 the process proceeds to Step 5. If another "right" gesture input is detected while on menu R1, the device displays the R2 menu. If a gesture is detected that is not a "right" gesture, the device displays the corresponding X1 Menu (U1, D1, or L1 in this case).

Step 3A: An "up" gesture is recognized by the device while the U1 menu is being displayed. The processor sets display to the U2 Menu. The processor flags U2 and stores the setting in the device's memory. In some embodiments, the device remembers the flagged menu and any following controls will be determined by inputs received while the flagged menu is displayed. The keypad timer starts after the last input is received. If the keypad timer expires, the process returns to Step 1B. If a press-button input is received while on menu U2 the process proceeds to Step 6. If another "up" gesture input is detected while on menu U2, the device displays the U3 menu. If a gesture is detected that is not an "up" gesture, the device displays the corresponding X1 Menu (D1, L1, or R1 in this case).

Step 3B: A "down" gesture is recognized by the device while the D1 menu is being displayed. The processor sets display to the D2 Menu. The processor flags D2 and stores the setting in the device's memory. In some embodiments, the device remembers the flagged menu and any following controls will be determined by inputs received while the flagged menu is displayed. The keypad timer starts after the last input is received. If the keypad timer expires, the process returns to Step 1B. If a press-button input is received while on menu D2 the process proceeds to Step 6. If another "down" gesture input is detected while on menu D2, the device displays the D3 menu. If a gesture is detected that is not a "down" gesture, the device displays the corresponding X1 Menu (U1, L1, or R1 in this case).

Step 3C: A "left" gesture is recognized by the device while the L1 menu is being displayed. The processor sets display to the L2 Menu. The processor flags L2 and stores the setting in the device's memory. In some embodiments, the device remembers the flagged menu and any following controls will be determined by inputs received while the flagged menu is displayed. The keypad timer starts after the last input is received. If the keypad timer expires, the process returns to Step 1B. If a press-button input is received while on menu L2 the process proceeds to Step 6. If another "left" gesture input is detected while on menu L2, the device displays the L3 menu. If a gesture is detected that is not a "left" gesture, the device displays the corresponding X1 Menu (U1, D1, or R1 in this case).

Step 3D: A "right" gesture is recognized by the device while the R1 menu is being displayed. The processor sets display to the R2 Menu. The processor flags R2 and stores the setting in the device's memory. In some embodiments, the device remembers the flagged menu and any following controls will be determined by inputs received while the flagged menu is displayed. The keypad timer starts after the last input is received. If the keypad timer expires, the process returns to Step 1B. If a press-button input is received while on menu R2 the process proceeds to Step 6. If another "right" gesture input is detected while on menu R2, the device displays the R3 menu. If a gesture is detected that is not a "right" gesture, the device displays the corresponding X1 Menu (U1, D1, or L1 in this case).

Step 4: A press-button input is detected during the default display. In some embodiments, a press button function will depend on what control is programmed to respond from the default display. A down press and release may turn off a light or group of lights, lower a shade, or lower a temperature set point, or control another device. An up press and release may turn on a light or group of lights, raise a shade, or raise a temperature set point, or control another device. A up press and hold may dim up a light or group of lights, continuously raise a shade, or continuously raise a temperature set point, or control another device until the press is released. A down press and hold may dim a light or group of lights, continuously lower a shade, or continuously lower a temperature setpoint, or control another device the press until released. For this example we assume that the default function is programmed to control a group of lights in a room. The step repeats in the case where another press-button input is received, or the process proceeds to Step 2.

Step 5: A press-button input is detected during the X1 Menu display. In some embodiments, a press button function will depend on what control is programmed to respond from the default display. A down press and release may turn off a light or group of lights, lower a shade, or lower a temperature set point, or control another device. An up press and release may turn on a light or group of lights, raise a shade, or raise a temperature set point, or control another device. A up press and hold may dim up a light or group of lights, continuously raise a shade, or continuously raise a temperature set point, or control another device until the press is released. A down press and hold may dim a light or group of lights, continuously lower a shade, or continuously lower a temperature setpoint, or control another device the press until released. For this example we assume that the default function is programmed to control a heating system. The step repeats in the case where another press-button input is received, the keypad timer is started and the process proceeds to Step 2.

Step 6: A press-button input is detected during the X2 Menu display. In some embodiments, a press button function will depend on what control is programmed to respond from the default display. A down press and release may turn off a light or group of lights, lower a shade, or lower a temperature set point, or control another device. An up press and release may turn on a light or group of lights, raise a shade, or raise a temperature set point, or control another device. A up press and hold may dim up a light or group of lights, continuously raise a shade, or continuously raise a temperature set point, or control another device until the press is released. A down press and hold may dim a light or group of lights, continuously lower a shade, or continuously lower a temperature setpoint, or control another device the press until released. For this example we assume that the default function is programmed to control a humidity system. The step repeats in the case where another press-button input is received, the keypad timer is started and the process proceeds to Step 2.

Figure 20:
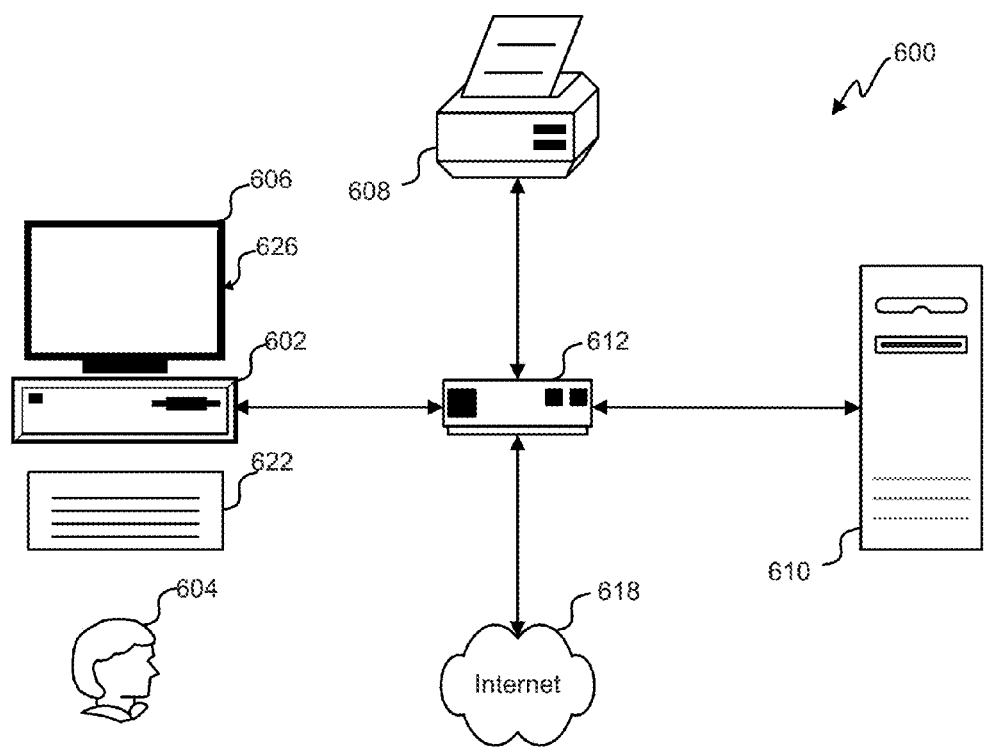
FIG. 20 is a schematic illustration of one embodiment of the computer system.

With reference now to FIG. 20, an exemplary environment with which embodiments may be implemented is shown with a computer system 600 that can be used by a user 604 as all or a component of a program optimization system 100. The computer system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. The monitor 606 can be a CRT, flat screen, etc.

A user 604 can input commands into the computer 602 using various input devices, such as a mouse, keyboard 622, track ball, touch screen, etc. If the computer system 600 comprises a mainframe, a designer 604 can access the computer 602 using, for example, a terminal or terminal interface. Additionally, the computer system 626 may be connected to a printer 608 and a server 610 using a network router 612, which may connect to the Internet 618 or a WAN.

The server 610 may, for example, be used to store additional software programs and data. In one embodiment, software implementing the systems and methods described herein can be stored on a storage medium in the server 610. Thus, the software can be run from the storage medium in the server 610. In another embodiment, software implementing the systems and methods described herein can be stored on a storage medium in the computer 602. Thus, the software can be run from the storage medium in the computer system 626. Therefore, in this embodiment, the software can be used whether or not computer 602 is connected to network router 612. Printer 608 may be connected directly to computer 602, in which case, the computer system 626 can print whether or not it is connected to network router 612.

Figure 21:
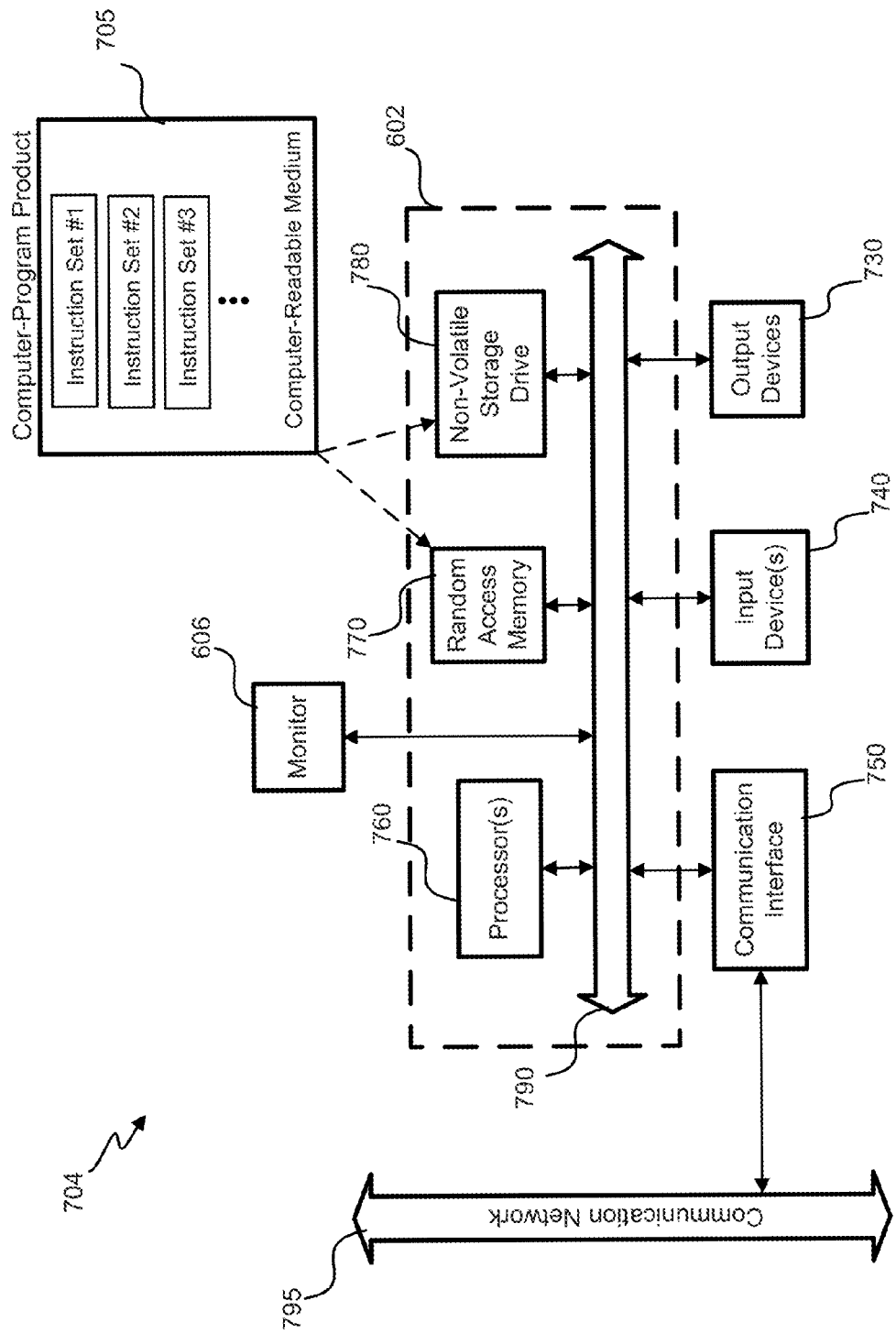
FIG. 21 is a schematic illustration of one embodiment of a special-purpose computer system.

With reference to FIG. 21, an embodiment of a special-purpose computer system 704 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose computer system 704.

Special-purpose computer system 704 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs system 704 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft® Corporation, Solaris® from Oracle®, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks 795 and devices and may serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within the computer 602

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A multi-purpose electronic switch, comprising:
    a housing having a front and a back and defining an internal volume;
    a switch having a default position and movable to a first position and a second position from the default position, wherein the switch is configured to receive a press-button input moving the switch from the default position to one of the first and second positions;
    a display located on the switch;
    a plurality of sensors located within the internal volume of the housing and configured to detect a swipe input across the front of the housing; and
    a processor located within the internal volume of the housing and communicatingly connected with the switch, the display, and the plurality of sensors, wherein the processor is configured to:
        control the display to generate images representing a plurality of menu items and settings within the menu items;
        receive an input from the plurality of sensors selecting one of the plurality of menu items;
        receive an input from the switch changing a setting within the selected one of the plurality of menu items;
        navigate between a first set of menu items in response to a swipe between a left side of the switch and a right side of the switch; and
        navigate between a second set of menu items in response to a swipe between a top of the switch and a bottom of the switch.

2. The multi-purpose electronic switch of claim 1, wherein the switch comprises a rocker switch.

3. The multi-purpose electronic switch of claim 2, wherein the plurality of sensors comprise: a first sensor, a second sensor, a third sensor, and a fourth sensor.

4. The multi-purpose electronic switch of claim 3, wherein the first sensor is located proximate to the left side of the switch, the second sensor is located proximate to the right side of the switch, the third sensor is located proximate to the top of the switch, and the fourth sensor is located proximate to the bottom of the switch.

5. The multi-purpose electronic switch of claim 4, wherein the first and second sensors are configured to detect a swipe between the left side of the switch and the right side of the switch, and wherein the third and fourth sensors are configured to detect a swipe between the top of the switch and the bottom of the switch.

6. The multi-purpose electronic switch of claim 5, wherein at least one of the first, second, third, and fourth sensors comprises a capacitive sensor.

7. The multi-purpose electronic switch of claim of claim 6, further comprising an antenna module controllable by the processor to transmit and receive radio signals.

8. The multi-purpose electronic switch of claim 7, wherein the processor is configured to control the antenna module to transmit a radio signal to control operation of a device in communication with the multi-purpose electronic switch in response to an input received by the switch.

9. The multi-purpose electronic switch of claim 8, further comprising a power source comprising one of: a battery, low-voltage wires, and line-voltage wires.

10. The multi-purpose electronic switch of claim 9, wherein the housing comprises a first recess in the back of the housing and an adhesive located in the recess.

11. The multi-purpose electronic switch of claim 10, wherein the housing comprises a second recess located in the back of the housing and extending to a side of the housing.

12. The multi-purpose electronic switch of claim 9, wherein the display comprises an electronic paper display.

\* \* \* \* \*